US012779390B2

(12) United States Patent
Kelemen et al.

(10) Patent No.: US 12,779,390 B2
(45) Date of Patent: Nov. 3, 2026

(54) SYSTEMS AND METHODS FOR ENHANCED WEATHERING AND CALCINING FOR CO2 REMOVAL FROM AIR

(71) Applicants: THE TRUSTEES OF COLUMBIA UNIVERSITY IN THE CITY OF NEW YORK, New York, NY (US); The University of British Columbia, Vancouver (CA); The Trustees of the University of Pennsylvania, Philadelphia, PA (US)

(72) Inventors: Peter Boushall Kelemen, Nyack, NY (US); Wade McGillis, New York, NY (US); Jennifer Wilcox, Philadelphia, PA (US); Noah McQueen, Overland Park, KS (US); Thomas Mortimer, Reading (GB); Greg Dipple, Vancouver (CA)

(73) Assignees: The Trustees of Columbia University in the City of New York, New York, NY (US); The Trustees of the University of Pennysylvania, Philadelphia, PA (US); The University of British Columbia, Vancouver (CA)

( * ) Notice: Subject to any disclaimer, the term of this patent is extended or adjusted under 35 U.S.C. 154(b) by 116 days.

(21) Appl. No.: 18/241,522

(22) Filed: Sep. 1, 2023

(65) Prior Publication Data

US 2024/0269605 A1 Aug. 15, 2024

Related U.S. Application Data

(63) Continuation of application No. PCT/US2022/018484, filed on Mar. 2, 2022.

(Continued)

(51) Int. Cl.
*B01D 53/02* (2006.01)
*B01D 53/06* (2006.01)
(Continued)

(52) U.S. Cl.
CPC .......... *B01D 53/06* (2013.01); *B01D 53/025* (2013.01); *B01J 20/3021* (2013.01);
(Continued)

(58) Field of Classification Search
CPC ........ B01D 2251/304; B01D 2251/402; B01D 2251/404; B01D 2257/504;
(Continued)

(56) References Cited

U.S. PATENT DOCUMENTS 8,226,917 B2 7/2012 Fan et al.
8,512,661 B2 8/2013 Fan et al.
(Continued)

FOREIGN PATENT DOCUMENTS

WO 2018164589 A1 9/2018
WO 2020263910 A1 12/2020

OTHER PUBLICATIONS

International Search Report and The Written Opinion of the International Searching Authority, International Application No. PCT/US2022/018484, mailed Jun. 16, 2022.
(Continued)

*Primary Examiner* — Christopher P Jones
(74) *Attorney, Agent, or Firm* — Barclay Damon LLP; Anthony P. Gangemi

(57) ABSTRACT

Embodiments described herein relate to systems and methods of $CO_2$ uptake. In one aspect, a method includes applying heat to a calciner to decompose a carbon-containing stream to a gas stream and a stream of a carbonation medium, the gas stream including $CO_2$. The method further includes sequestering and/or utilizing the gas stream, feed-
(Continued)

ing the stream of the carbonation medium to a carbonation station, contacting the carbonation medium with ambient air at the carbonation station, such that the carbonation medium adsorbs $CO_2$ to form the carbon-containing stream, during the contacting, adding a water stream to the carbonation medium at intervals of about 30 minutes to about 72 hours, and feeding the carbon-containing stream to the calciner. In some embodiments, adding the water stream is via misting and/or spraying.

23 Claims, 12 Drawing Sheets

Related U.S. Application Data

(60) Provisional application No. 63/155,572, filed on Mar. 2, 2021.

(51) Int. Cl.
*B01J 20/30* (2006.01)
*C10B 57/00* (2006.01)
*C10B 57/04* (2006.01)

(52) U.S. Cl.
CPC ............ *C10B 57/005* (2013.01); *C10B 57/04* (2013.01); *B01D 2257/504* (2013.01)

(58) Field of Classification Search
CPC .. B01D 2258/06; B01D 53/025; B01D 53/06; B01D 53/62; B01D 53/96; B01J 20/3021; C01B 32/55; C10B 57/005; C10B 57/04; Y02C 20/40
See application file for complete search history.

(56) References Cited

U.S. PATENT DOCUMENTS

| | | | |
|---|---|---|---|
| 9,174,844 | B2 | 11/2015 | Ramkumar et al. |
| 9,719,417 | B2 * | 8/2017 | Kumar .................... F01K 23/10 |
| 9,994,453 | B2 | 6/2018 | Rossi |
| 10,213,730 | B1 * | 2/2019 | Younes ................... C01B 17/43 |
| 2006/0093540 | A1 | 5/2006 | Fan et al. |
| 2008/0031801 | A1 | 2/2008 | Lackner et al. |
| 2010/0266477 | A1 | 10/2010 | Ishii |
| 2011/0113957 | A1 | 5/2011 | Sceats |
| 2011/0286902 | A1 * | 11/2011 | Fan ........................ B01J 20/043 422/619 |
| 2013/0255257 | A1 | 10/2013 | Agostinelli et al. |
| 2014/0120017 | A1 | 5/2014 | Sceats |
| 2014/0161696 | A1 * | 6/2014 | Stallmann .......... B01D 53/1475 423/220 |
| 2015/0343373 | A1 * | 12/2015 | Balfe ..................... B01D 53/73 422/177 |
| 2017/0327421 | A1 * | 11/2017 | Heidel ..................... D21C 3/02 |
| 2020/0009527 | A1 | 1/2020 | Weissman et al. |

OTHER PUBLICATIONS

Tian, S., et al., “Calcium-looping reforming of methane realizes in situ CO2 utilization with improved energy efficiency,” Science Advances, vol. 5, pp. 1-9, Apr. 2019.

Zubir, M.A., et al., “CO2 Capture for Dry Reforming of Natural Gas: Performance and Process Modeling of Calcium Carbonate Looping Using Acid Based CaCO3 Sorbent,” Frontiers in Energy Research, vol. 8, Article 610521, Jan. 2021.

Arcenegui-Troya, J., et al., “Calcium-Looping Performance of Biomineralized CaCO3 for CO2 Capture and Thermochemical Energy Storage,” Industrial & Engineering Chemistry Research, vol. 29, Issue 59, p. 12924-12933, Jun. 2020.

Erans, M., et al., “Carbonation of lime-based materials under ambient conditions for direct air capture,” Journal of Cleaner Production, vol. 242, Article 118330, Jan. 2020.

Samari, M., et al., “Direct capture of carbon dioxide from air via lime-based sorbents,” Mitigation and Adaptation Strategies for Global Change, vol. 28, Issue 1, pp. 25-41, Jan. 2020.

Ren, J., et al., “One-Pot Synthesis of Carbon Nanofibers from CO2,” Nano Letters, vol. 15, Issue 9, pp. 6142-6148, Sep. 2015.

Antzara, A., et al., “Improving the stability of synthetic CaO-based CO2 sorbents by structural promoters,” Applied Energy, vol. 156, pp. 331-343, Oct. 2015.

Sun, H., et al., “Dual functional catalytic materials of Ni over Ce-modified CaO sorbents for integrated CO2 capture and conversion,” Applied Catalysis B: Environmental, vol. 244, pp. 63-75, May 2019.

Extended European Search Report in corresponding European Application No. 22763957.2 mailed Jul. 7, 2025, 5 pages.

Abanades J. Carlos et al: “An air CO 2 capture system based on the passive carbonation of large Ca(OH) 2 structures”, Sustainable Energy & Fuels, vol. 4, No. 7, Jan. 1, 2020 (Jan. 1, 2020), pp. 3409-3417.

Nikulshina V et al: “CO"2 capture from atmospheric air via consecutive CaO-carbonation and CaCO"3-calcination cycles in a fluidized-bed solar reactor, Chemical Engineering Journal, Elsevier, Amsterdam, NL, vol. 146, No. 2, Feb. 1, 2009 (Feb. 1, 2009), pp. 244-248, XP025715916, ISSN: 1385-8947.

Morales-Flrez V. et al: “Hydration and carbonation reactions of calcium oxide by weathering: Kinetics and changes in the nanosctructure”, Chemical Engineering Journal, vol. 265, Apr. 1, 2015 (Apr. 1, 2015), Amsterdam, NL, pp. 194-200.

Coppola Antonio et al: “Reactiviation by water hydration of the CO2capture capacity of a calcium looping sorbent”, Fuel, IPC Sience and Technology Press, Guilford, GB, vol. 127, Sep. 30, 2013 (Sep. 30, 2013), pp. 109-115, XP028837112, ISSN: 0016-2361, DOI: 10.1016/J.FUEL.2013.09.059 [A] 1-15.

Manovic Vasilije et al: Spray Water Reactivation/Pelletization of Spent CaO-based Sorbent from Calcium Looping Cycles, Environmental Science & Technology, vol. 46, No. 22, Nov. 1, 2012 (Nov. 1, 2012), US, pp. 12720-12725, XP093295133, ISSN: 0013-936X, Retrieved from the Internet DOI: 10.1021/es303252j [A] 1-15.

Office Action in coresponding Japanese Application No. 2023-553989, dated Nov. 5, 2025; 8 pages.

Office Action in corresponding Korean Application No. 10-2023-7032426, mailed Sep. 18, 2025; 10 pages.

* cited by examiner

SYSTEMS AND METHODS FOR ENHANCED WEATHERING AND CALCINING FOR CO2 REMOVAL FROM AIR

RELATED APPLICATIONS

This application is a continuation of International Patent Application No. PCT/US2022/018484, filed Mar. 2, 2022, which claims priority and benefit of U.S. Provisional Application No. 63/155,572, filed Mar. 2, 2021 and titled "Systems and Methods for Enhanced Weathering and Calcining for $CO_2$ Removal from Air," the disclosure of which is hereby incorporated by reference herein in its entirety.

TECHNICAL FIELD

Embodiments described herein relate systems and methods for uptake of carbon dioxide ($CO_2$) from ambient air.

BACKGROUND

The atmospheric concentration of $CO_2$ has reached 410 parts per million by volume (ppm), an increase of almost 20 ppm in the last 10 years. As current emission levels exceed 35 $GtCO_2$/year, a diverse portfolio of $CO_2$ mitigation technologies must be developed and strategically deployed to avoid a 2° C. increase in Earth's temperature by 2100. Due to global reliance on fossil fuels, this portfolio must include technologies that can remove current and future $CO_2$ emissions from the atmosphere, some of which include the acceleration of natural processes such as the $CO_2$ uptake of oceans and the terrestrial biosphere (soils, forests, minerals), bioenergy with carbon capture and storage (BECCS), and synthetic approaches using chemicals also known as direct air capture with storage (DACS) technologies.

SUMMARY

Embodiments described herein relate to systems and methods of $CO_2$ uptake. In one aspect, a method includes applying heat to a calciner to decompose a carbon-containing stream to a gas stream and a stream of a carbonation medium, the gas stream including $CO_2$. The method further includes sequestering and/or utilizing the gas stream, feeding the stream of the carbonation medium to a carbonation station, contacting the carbonation medium with ambient air at the carbonation station, such that the carbonation medium adsorbs or reacts with $CO_2$ to form the carbon-containing stream, during the contacting, adding a water stream to the carbonation medium at intervals of about 30 minutes to about 72 hours, and feeding the carbon-containing stream to the calciner. In some embodiments, adding the water stream is via misting and/or spraying. In some embodiments, the water is added at a rate of between about 0.01 and about 0.5 mL of water per gram of carbonation medium. In some embodiments, the carbonation medium is maintained at a moisture content between about 3 wt % and about 50 wt %. In some embodiments, the method can further include grinding a sorbent material to form the carbonation medium in a powder via a ball mill crusher, an impact crusher, and/or a cone crusher.

DETAILED DESCRIPTION

Figure 1:
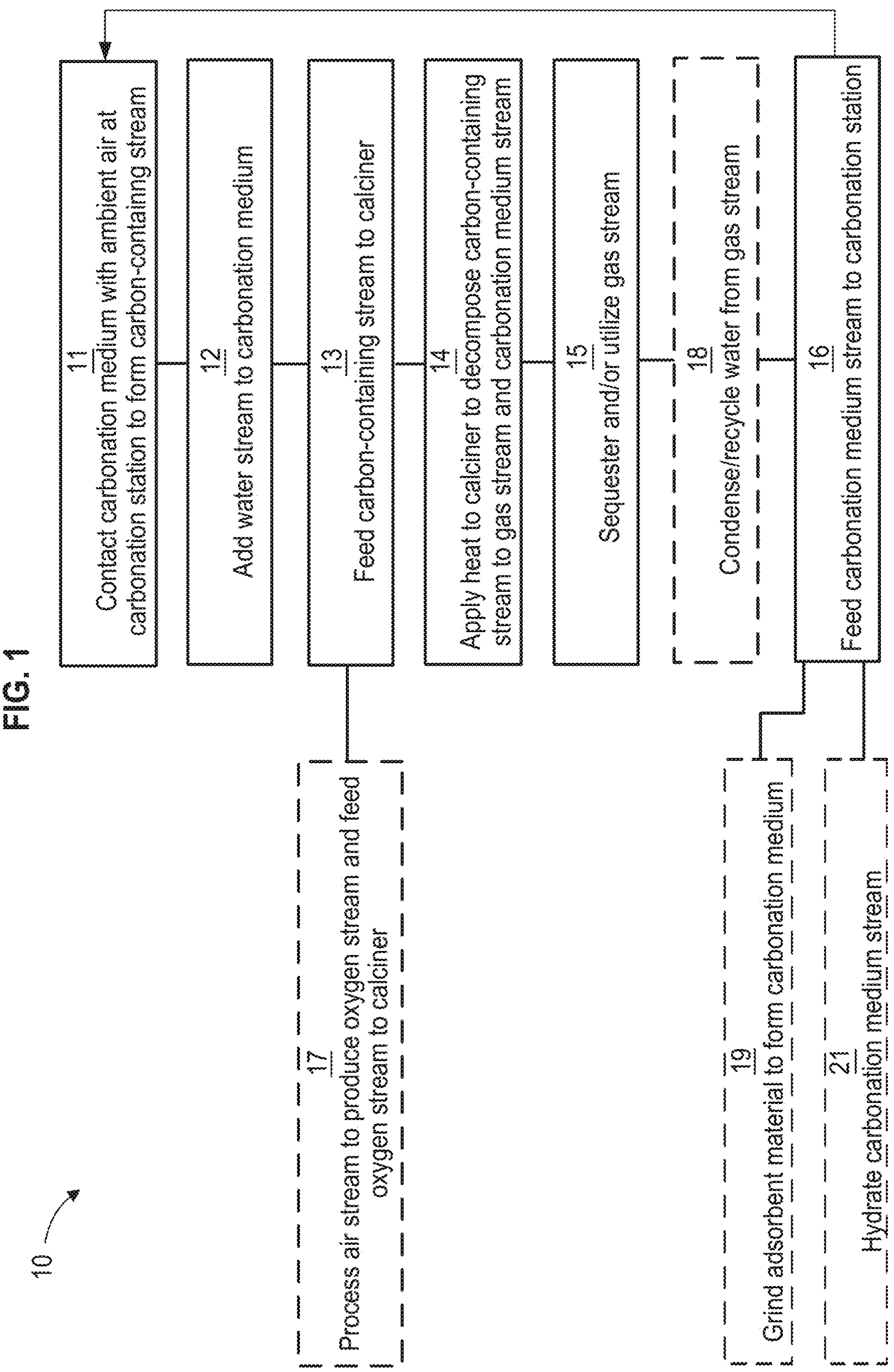
FIG. 1 is a block diagram of a method of $CO_2$ capture from ambient air, according to an embodiment.

Some embodiments of the present disclosure are directed to $CO_2$ uptake from air during weathering. The uptake can be on time scales of months to years, achieving valuable $CO_2$ removal from air while lowering the looping costs. Embodiments described herein can relate to methods for using material including metal carbonates as a feedstock for carbon capture and removal. Heating of material yields $CO_2$ gas and solid metal oxides and metal hydroxides from the carbonates. These metal oxide and metal hydroxide products can be layered thinly in an outdoor area and subjected to weathering over a series of months or years, during which the metal oxides and metal hydroxides absorb $CO_2$ from the air to generate additional metal carbonates, other hydrated magnesium carbonates, etc. The cycle can then be repeated, with the carbonates being heated to release $CO_2$ into a controlled capture environment. The resulting reactive oxides and/or hydroxides can then be layered again for weathering, and the captured $CO_2$ can be bottled and sold or stored underground.

Negative Emission Technologies (NET's), also known as carbon dioxide removal (CDR) technologies, encompass a broad range of strategies for $CO_2$ removal from air. Some methods employed include bioenergy, afforestation, direct air capture and ocean fertilization. Energy efficiency is important for adoption and implementation of either of these strategies. NETs should be carbon negative if they are to be adopted on a large scale. In other words, methods of $CO_2$ removal from air should extract more carbon from the atmosphere than they emit in the process. Efficiency of carbon removal has only recently become a technological focus.

The contribution of $CO_2$ to global warming is well documented. Recently, carbon capture methods have been developed for point-of-release carbon capture (e.g., at the smokestack or near the exhaust port). Previous approaches included $CO_2$ capture from flue gas and other concentrated sources, in smokestacks or reactors, on time scales of minutes to days. Such systems often rely on faster reaction times and higher energy investments, e.g., application of high heat and/or pressure. These solutions are often expensive, and they occasionally employ designer materials that may be difficult to produce. Costs of $100/ton of $CO_2$ produced are optimistic cost estimates for direct air capture, but realistic for point source capture where $CO_2$ is more concentrated.

The Intergovernmental Panel on Climate Change, (IPCC) and other authoritative organizations, have determined that $CO_2$ removal from air is necessary to hold global warming to less than 2° C. $CO_2$ removal from air is more difficult than $CO_2$ capture from flue gas. Current technology involves "direct air capture" machines (DAC) that remove $CO_2$ from air at a cost at or above $600/ton $CO_2$. The reaction of $CO_2$ with certain calcium and magnesium oxides has been widely recognized for many years as a form of rock weathering and subsequent carbon sink. Natural weathering removes vast quantities of $CO_2$ and this could be adapted to help offset some of the emissions being produced worldwide. Enhanced carbon capture through reaction of $CO_2$ with ultramafic rock is one NET that can be scaled up to alleviate impacts of climate change.

Enhanced weathering dates back to 1990, when Walter Seifritz proposed a process based on natural weathering. In natural weathering, alkaline-containing minerals are carbonated on geologic timescales (i.e., millions of years). The generalized natural weathering reaction is described below:

$$MeO + CO_2 \longrightarrow MeCO_3 + Energy$$

where Me represents a divalent metal cation.

Cations can include magnesium ($Mg^{2+}$) and calcium ($Ca^{2+}$), where suitable feedstocks include minerals, such as olivine and serpentine, as well as industrial byproducts, such as mine tailings and fly ash. Since the natural weathering reaction occurs on geological timescales, various process conditions, pretreatment methods, extraction mechanisms, and other strategies can expedite process kinetics as a form of $CO_2$ sequestration.

Several $CO_2$ capture systems have been explored. The American Physical Society, in a 2011 study, evaluated a system where $CO_2$ is absorbed by sodium hydroxide (NaOH) and subsequently reacted with calcium hydroxide ($Ca(OH)_2$) to produce solid calcium carbonate ($CaCO_3$). The $CaCO_3$ is then calcined in an oxy-fired calciner to release the $CO_2$. Keith et al. propose a continuous looping process including an aqueous potassium hydroxide (KOH) sorbent coupled with a calcium caustic recovery loop. The KOH sorbent reacts with $CO_2$ in the air to produce potassium carbonate ($K_2CO_3$). The $K_2CO_3$ then reacts with $Ca(OH)_2$, produced from $CaCO_3$, to reproduce the KOH and $CaCO_3$. These types of aqueous calcium looping systems have been primarily evaluated using calcium-based sorbents in aqueous conditions (in the form of $Ca(OH)_2$). Additionally, Renforth and Kruger proposed an ocean liming process which deposits lime (produced from calcined carbonate materials) into the ocean to react with carbonic acid currently in the ocean. The process increases oceanic pH and leads to the dissolution of more $CO_2$ into the ocean water, reducing the atmospheric concentration of $CO_2$. Additional systems utilizing mineral carbonation reactions have looked at various forms of carbon mineralization as a method to capture $CO_2$ from more concentrated point sources, such as power plants.

In the aforementioned processes, calcium-bearing minerals are often used as the source of alkalinity to capture $CO_2$. However, the calcination temperature of $MgCO_3$ is lower than that of $CaCO_3$, theoretically leading to a lower associated energy cost. Magnesium is also an attractive option, as there are large deposits of magnesium-rich minerals throughout the world. The IPCC and other organizations concluded that, even with optimally fast implementation of carbon-free electrical generation and other innovations, global warming would exceed 2° C. by 2100 unless about 10 billion tons of $CO_2$ are removed from the atmosphere until 2050 increasing to 20 billion tons by 2100. In turn, there is consensus that warming beyond 2° C. is likely to have catastrophic impacts on human sustainability. Options for negative emissions that can grow to scales of about 1 billion tons of $CO_2$ per year include increasing the carbon content of agricultural soils, reforestation, adding alkalinity to the oceans, adding biomass in the oceans, and various engineered routes of $CO_2$ removal from air (e.g., direct air capture (DAC). The National Academies Report on Negative Emissions Technologies from 2019 concluded that none of these methods, individually, can reach the required goal, so an ensemble of methods should be used. While it seems unclear how the cost of such an ensemble will be supported, there does seem to be a growing consensus (including most national governments worldwide) that carbon capture and carbon removal will be an important component of carbon remediation.

Limestone is mined for use as crushed rock for many purposes, for use as a fertilizer, and for use in both cement and steel production. However, limestone reserves and resources are essentially unlimited from a practical point of view. Magnesite ($MgCO_3$) is mined primarily for production of Mg metal, used in alloys. Targeted rock is used in many other industries: limestone for cement, $MgCO_3$ for refractory, agriculture, and other uses. Global $MgCO_3$ reserves are estimated to be 7 or 8 billion tons.

Regarding the mechanisms for material handling (e.g., loading and unloading vast amounts of carbonated media), much of the material handling infrastructure already developed in the industrial and agricultural fields can be leveraged. Some embodiments described herein include the use of electric kilns and photovoltaics. Photovoltaics laid out between plots of carbonation medium can give about 30 times more space to spread out the plots of carbonation medium.

Methods described herein can use geological materials rich in magnesium, calcium, and/or sodium. A techno-economic analysis (TEA) of an exemplary embodiment based on use of $MgCO_3$ was produced. Mg-carbonate was calcined, at temperatures as low as 600° C. Produced $CO_2$ (from air and from $CH_4$ combustion in an oxy-fired calciner) is stored or sold. Produced, fine-grained MgO is distributed over the land surface for weathering. The TEA assumes a layer 10 cm thick and daily stirring, with no cm- to mm-scale passivation, for >90% carbonated in a year (based on data on $CO_2$ uptake in brucite, $Mg(OH)_2$). More recent data indicate that >90% carbonation can be attained in six months. Newly carbonated material is calcined, newly produced $CO_2$ is stored or sold, and newly produced MgO is redistributed for the next stage of weathering. This looping process combines processes so that cost estimates may be relatively robust compared to those for more complex DAC methods. Cost is estimated to be $48 to $159/ton $CO_2$ net-removed from air. The cost of produced $CO_2$, including $CO_2$ captured from combustion, is estimated to be $24 to $79/ton. These costs are comparable to estimated costs for other DAC methods. In fact, the estimated cost for MgO looping may currently be the lowest peer-reviewed cost estimate for DAC.

Limestone includes about 56 wt % CaO. After calcining, CaO generally reacts rapidly with air to form $Ca(OH)_2$. Carbonation of this material via reaction with ambient air removes about 0.78 tons of $CO_2$ per ton of initial CaO, or 0.44 tons of $CO_2$ per ton of limestone per carbonation+calcination cycle. Results from exemplary embodiments have achieved an average $Ca(OH)_2$ carbonation rate of about 6E-7/s (mass fraction $Ca(OH)_2$ consumed per second by reaction with $CO_2$ from ambient air to produce $CaCO_3$). In turn, if this rate is constant, it will lead to 50% carbonation in about two weeks, 75% in about a month, 90% carbonation in 1.5 months, and 95% in about two months. In some embodiments, taking the 75% value, there would be 12 calcination cycles per year, removing 3.75 tons of $CO_2$ from air per ton of limestone in the first year, assuming 1% loss of CaO per cycle. After ten years, the process would remove about 23 tons of $CO_2$ from air per initial ton of limestone. In this calculation, to remove 1 Gt of $CO_2$ from air per year for ten years would utilize one-time mining and processing 43.4 Mt of limestone. This is about 1.5 times more than current annual US production (32 Mt/year).

In some embodiments, systems described herein can be implemented where renewable energy capabilities overlap with $CO_2$ storage opportunities globally. This presents opportunities to co-locate with energy and $CO_2$ storage, specifically in the southern region of the US. It is estimated that, at an industry standard cost of $30/ton for feedstock transport, it will cost about $800,000 per year to transport the makeup feedstock for operation of a 1 Mt/year power plant. Moreover, if limestone (including $CaCO_3$) is used and calcium oxide (CaO) is produced from $CaCO_3$, CaO is regionally ubiquitous and effectively an unlimited resource.

In some embodiments, $MgCO_3$ can be used as a feedstock. In some embodiments, the $MgCO_3$ feedstock can be produced by initial weathering of quarried, ground mantle peridotite, rich in MgO. $Mg(OH)_2$ often makes up a small portion of many peridotites. $Mg(OH)_2$ reacts rapidly with $CO_2$ in air to form $MgCO_3$ in weathering conditions. Heating of peridotites including the mineral serpentine increases the rate at which serpentine reacts atmospheric $CO_2$ to form $MgCO_3$. Thus, after one or two heating cycles, a significant proportion of altered peridotite would be transformed to caustic magnesia. In some embodiments, $CaCO_3$ or dolomite (high magnesium calcium carbonate) can be used as feedstock.

Some exemplary embodiments of replenished metal oxides and hydroxides include CaO and $Ca(OH)_2$ from $CaCO_3$, $Na_2O$ and NaOH from sodium carbonates and hydrated sodium carbonates, $Mg(OH)_2$ and MgO from $MgCO_3$ and hydrated Mg carbonates, and combinations thereof. Because $CaCO_3$ is a primary constituent of limestone, looping of CaO and $CaCO_3$ can greatly expand available feedstock and therefore the capacity for processes described herein to remove $CO_2$ from air.

As used herein, "carbonation plot," includes single contiguous plots, as well as semi- or non-contiguous plots that are then grouped or processed together to effectively act as a single plot. In some embodiments, carbonation plots include a composition that sequesters a target compound (e.g., $CO_2$). In some embodiments, carbonation plots are positioned and configured to expose the composition to ambient conditions. In some embodiments, carbonation plots can include a composition that sequesters a target compound.

As used herein, "stream" can refer to stream that includes solid, liquid, and/or gas. For example, a stream can include a solid in granular form conveyed on a conveyor device. A stream can also include a liquid and/or gas flowing through a pipe. A stream can include a solution.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of contactors, the set of contactors can be considered as one contactor with multiple portions, or the set of contactors can be considered as multiple, distinct contactors. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "about" and "approximately" generally mean plus or minus 10% of the value stated, e.g., about 250 μm would include 225 μm to 275 μm, about 1,000 μm would include 900 μm to 1,100 μm.

FIG. 1 is a block diagram of a method 10 of $CO_2$ capture from ambient air, according to an embodiment. As shown, the method 10 includes contacting a carbonation medium with ambient air at a carbonation station to form carbon-containing stream at step 11, adding a water stream to the carbonation medium at step 12, feeding the carbon-containing stream to a calciner at step 13, applying heat to the calciner to decompose the carbon-containing stream to a gas stream and the carbonation medium stream at step 14, sequestering and/or utilizing the gas stream at step 15, and feeding the carbonation medium stream to the carbonation station at step 16, where the process repeats again from step 11. The method 10 optionally includes processing an air stream to produce an oxygen stream and feeding the oxygen stream to the calciner at step 17, condensing and/or recycling water from the sequestered gas stream at step 18, grinding sorbent material to form the carbonation medium at step 19, and/or hydrating the carbonation medium stream at step 21.

Step 11 includes contacting the carbonation medium with ambient air at a carbonation station to from a carbon-containing stream. The carbonation medium adsorbs or reacts with carbon dioxide from the ambient air. The carbonation medium and the carbon dioxide react chemically to form the carbon-containing stream. In some embodiments, the carbonation medium can be from mined rocks. In some embodiments, the carbonation medium can be recycled (e.g., from the calciner). In some embodiments, the carbonation medium can include magnesium oxide, magnesium silicates, silicon dioxide, calcium oxide, calcium hydroxide, calcium silicates, sodium oxide, sodium hydroxide, potassium oxide, potassium hydroxide, and/or magnesium hydroxide In some embodiments, the carbonation medium can be incorporated into one or more carbonation plots. In some embodiments, the carbonation medium can be in the form of a powder. In some embodiments, the carbonation medium can be in the form of pebbles or large rocks. In some embodiments, the carbonation medium can have an average particle size of at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, the carbonation medium can have an average particle size of no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, no more than about 100 μm, no more than about 90 μm, no more than about 80 μm, no more than about 70 μm, no more than about 60 μm, no more than about 50 μm, no more than about 40 μm, no more than about 30 μm, or no more than about 20 μm.

Combinations of the above-referenced particle sizes are also possible (e.g., at least about 10 μm and no more than about 5 cm or at least about 100 μm and no more than about 1 cm), inclusive of all values and ranges therebetween. In some embodiments, the carbonation medium can have an average particle size of about 10 μm, about 20 μm, about 30 μm, about 40 μm, about 50 μm, about 60 μm, about 70 μm, about 80 μm, about 90 μm, about 100 μm, about 200 μm, about 300 μm, about 400 μm, about 500 μm, about 600 μm, about 700 μm, about 800 μm, about 900 μm, about 1 mm, about 2 mm, about 3 mm, about 4 mm, about 5 mm, about 6 mm, about 7 mm, about 8 mm, about 9 mm, about 1 cm, at least about 2 cm, about 3 cm, about 4 cm, or about 5 cm.

In some embodiments, the carbonation medium can be stationed at the carbonation station to contact the ambient air for at least about 1 hour, at least about 5 hours, at least about 10 hours, at least about 1 day, at least about 2 days, at least about 3 days, at least about 4 days, at least about 5 days, at least about 6 days, at least about 1 week, at least about 2 weeks, at least about 3 weeks, at least about 1 month, at least about 2 months, at least about 3 months, at least about 4 months, at least about 5 months, at least about 6 months, at least about 7 months, at least about 8 months, at least about 9 months, at least about 10 months, at least about 11 months, at least about 1 year, or at least about 1.5 years. In some embodiments, the carbonation medium can be stationed at the carbonation station to contact the ambient air for no more than about 2 years, no more than about 1.5 years, no more than about 1 year, no more than about 11 months, no more than about 10 months, no more than about 10 months, no more than about 9 months, no more than about 8 months, no more than about 7 months, no more than about 6 months, no more than about 5 months, no more than about 4 months, no more than about 3 months, no more than about 2 months, no more than about 1 month, no more than about 3 weeks, no more than about 2 weeks, no more than about 1 week, no more than about 6 days, no more than about 5 days, no more than about 4 days, no more than about 3 days, no more than about 2 days, no more than about 1 day, no more than about 10 hours, or no more than about 5 days.

Combinations of the above-referenced residence times of the carbonation medium at the carbonation station are also possible (e.g., at least 1 hour and no more than about 2 years or at least about 1 week and no more than about 3 months), inclusive of all values and ranges therebetween. In some embodiments, the carbonation medium can be stationed at the carbonation station to contact the ambient air for about 1 hour, about 5 hours, about 10 hours, about 1 day, about 2 days, about 3 days, about 4 days, about 5 days, about 6 days, about 1 week, about 2 weeks, about 3 weeks, about 1 month, about 2 months, about 3 months, about 4 months, about 5 months, about 6 months, about 7 months, about 8 months, about 9 months, about 10 months, about 11 months, about 1 year, about 1.5 years, or about 2 years.

In some embodiments, the carbonation medium can achieve at least about 50% conversion, at least about 55% conversion, at least about 60% conversion, at least about 65% conversion, at least about 70% conversion, at least about 75% conversion, at least about 80% conversion, at least about 85% conversion, at least about 90% conversion, or at least about 95% conversion during its residence time. In some embodiments, the carbon medium can achieve no more than about 99% conversion, no more than about 95% conversion, no more than about 90% conversion, no more than about 85% conversion, no more than about 80% conversion, no more than about 75% conversion, no more than about 70% conversion, no more than about 65% conversion, no more than about 60% conversion, or no more than about 55% conversion during its residence time. Combinations of the above-referenced conversion rates are also possible (e.g., at least about 50% and no more than about 99% or at least about 60% and no more than about 80%), inclusive of all values and ranges therebetween. In some embodiments, the carbonation medium can achieve about 50% conversion, about 55% conversion, about 60% conversion, about 65% conversion, about 70% conversion, about 75% conversion, about 80% conversion, about 85% conversion, about 90% conversion, about 95% conversion, or about 99% conversion during its residence time. In some embodiments, conversion of the carbonation medium by the $CO_2$ can be at a rate of about 1E-7, about 2E-7, about 3E-7, about 4E-7, about 5E-7, about 6E-7, about 7E-7, about 8E-7, about 9E-7, about 9E-7, about 1E-6, about 2E-6, about 3E-6, about 4E-6, about 5E-6, about 6E-6, about 7E-6, about 8E-6, about 9E-6, or about 1E-5 mass fraction per second, inclusive of all values and ranges therebetween. In some embodiments, the carbonation medium can be stirred or mixed during carbonation. In some embodiments, the carbonation medium can be stirred at intervals of about 6 hours, about 12 hours, about 18 hours, about a day, about 2 days, about 3 days, about 4 days, about 5 days, about 6 days, about 1 week, about 2 weeks, about 3 weeks, or about 4 weeks, inclusive of all values and ranges therebetween.

In some embodiments, the carbonation medium can be cycled seasonally. For example, the carbonation medium can be exposed to the ambient air at the carbonation station during the summer and spring and processed and/or stored elsewhere during the fall and winter. In some embodiments, a first portion of the carbonation medium can contact the ambient air at the carbonation station while a second portion of the carbonation medium is processed in the calciner and the second portion can contact the ambient air at the carbonation station while the first portion of the carbonation medium is processed in the calciner.

At step 12, a water stream is added to the carbonation medium. The moisture content of the carbonation medium can aid in maximizing the amount of $CO_2$ adsorbed from the ambient air. In some embodiments, step 12 can occur concurrently with step 11. In other words, the water stream is added to the carbonation medium while the carbonation medium is contacting the ambient air at the carbonation station. In some embodiments, step 12 can be fully concurrent with step 11. In some embodiments, step 12 can be partially concurrent with step 11. In some embodiments, steps 11 and 12 can be executed multiple times before proceeding to feeding the carbon containing stream to the calciner at step 13. In other words, the carbonation medium can be contacted with ambient air and water can be added to the carbonation medium multiple times before feeding the carbon-containing stream to the calciner. In some embodiments, the water stream can be added to the carbonation medium in the form of misting and/or spraying. In some embodiments, the water stream can be added via a hose, a pipe, a tube, or any combination thereof. In some embodiments, the water stream can be added in the form of steam.

In some embodiments, the water stream can be added at time intervals. In some embodiments, the water stream addition interval (i.e., the amount of time from the start of one water stream addition to the next water stream addition) can be at least about 30 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 12 hours, at least about 18 hours, at least about 24 hours, at least about 30 hours, at least about 36 hours, at least about 42 hours, at least about 48 hours, at least about 54 hours, at least about 60 hours, or at least about 66 hours. In some embodiments, the water stream addition interval can be no more than about 72 hours, no more than about 66 hours, no more than about 60 hours, no more than about 54 hours, no more than about 48 hours, no more than about 42 hours, no more than about 36 hours, no more than about 30 hours, no more than about 24 hours, no more than about 18 hours, no more than about 12 hours, no more than about 10 hours, no more than about 9 hours, no more than about 8 hours, no more than about 7 hours, no more than about 6 hours, no more than about 5 hours, no more than about 4 hours, no more than about 3 hours, no more than about 2 hours, or no more than about 1 hour.

Combinations of the above-referenced intervals between water stream additions are also possible (e.g., at least about 30 minutes and no more than about 72 hours or at least about 3 hours and no more than about 24 hours), inclusive of all values and ranges therebetween. In some embodiments, the water stream addition interval (i.e., the amount of time from the start of one water stream addition to the next water stream addition) can be about 30 minutes, about 1 hour, about 2 hours, about 3 hours, about 4 hours, about 5 hours, about 6 hours, about 7 hours, about 8 hours, about 9 hours, about 10 hours, about 12 hours, about 18 hours, about 24 hours, about 30 hours, about 36 hours, about 42 hours, about 48 hours, about 54 hours, about 60 hours, about 66 hours, or about 72 hours.

In some embodiments, each addition of a water stream can be at a rate of at least about 0.01, at least about 0.02, at least about 0.03, at least about 0.04, at least about 0.05, at least about 0.06, at least about 0.07, at least about 0.08, at least about 0.09, at least about 0.1, at least about 0.15, at least about 0.2, at least about 0.25, at least about 0.3, at least about 0.35, at least about 0.4, or at least about 0.45 mL of water per gram of carbonation medium. In some embodiments, each water stream can be added at a rate of no more than about 0.5, no more than about 0.45, no more than about 0.4, no more than about 0.35, no more than about 0.3, no more than about 0.25, no more than about 0.2, no more than about 0.15, no more than about 0.1, no more than about 0.09, no more than about 0.08, no more than about 0.07, no more than about 0.06, no more than about 0.05, no more than about 0.04, no more than about 0.03, or no more than about 0.02 mL of water per gram of carbonation medium.

Combinations of the above-referenced rates of water addition are also possible (e.g., at 0.01 mL and no more than about 0.5 mL of water per gram of carbonation medium or at least about 0.1 and no more than about 0.3 mL of water per gram of carbonation medium), inclusive of all values and ranges therebetween. In some embodiments, each addition of a water stream can be at a rate of about 0.01, about 0.02, about 0.03, about 0.04, about 0.05, about 0.06, about 0.07, about 0.08, about 0.09, about 0.1, about 0.15, about 0.2, about 0.25, about 0.3, about 0.35, about 0.4, about 0.45 mL, or about 0.5 mL of water per gram of carbonation medium.

In some embodiments, the carbonation medium can be maintained at a moisture level of at least about 3 wt %, at least about 4 wt %, at least about 5 wt %, at least about 6 wt %, at least about 7 wt %, at least about 8 wt %, at least about 9 wt %, at least about 10 wt %, at least about 15 wt %, at least about 20 wt %, at least about 25 wt %, at least about 30 wt %, at least about 35 wt %, at least about 40 wt %, or at least about 45 wt %. In some embodiments, the carbonation medium can be maintained at a moisture level of no more than about 50 wt %, no more than about 45 wt %, no more than about 40 wt %, no more than about 35 wt %, no more than about 30 wt %, no more than about 25 wt %, no more than about 20 wt %, no more than about 15 wt %, no more than about 10 wt %, no more than about 9 wt %, no more than about 8 wt %, no more than about 7 wt %, no more than about 6 wt %, no more than about 5 wt %, or no more than about 4 wt %. Combinations of the above-referenced moisture contents are also possible (e.g., at least about 3 wt % and no more than about 50 wt % or at least about 10 wt % and no more than about 40 wt %), inclusive of all values and ranges therebetween. In some embodiments, the carbonation medium can be maintained at a moisture level of about 3 wt %, about 4 wt %, about 5 wt %, about 6 wt %, about 7 wt %, about 8 wt %, about 9 wt %, about 10 wt %, about 15 wt %, about 20 wt %, about 25 wt %, about 30 wt %, about 35 wt %, about 40 wt %, about 45 wt %, or about 50 wt %.

In some embodiments, the method 10 can include monitoring relative humidity, temperature, and/or air velocity levels of the ambient air in close proximity (e.g., within about 100 m, within about 50 m, within about 10 m, within about 5 m, within about 1 m) to the carbonation station during the contacting of the carbonation medium with the ambient air In some embodiments, the water stream can be added continuously (e.g., in a continuous fine mist). In some embodiments, the water stream can be added at a rate of at least about 0.01, at least about 0.02, at least about 0.03, at least about 0.04, at least about 0.05, at least about 0.06, at least about 0.07, at least about 0.08, at least about 0.09, at least about 0.1, at least about 0.2, at least about 0.3, at least about 0.4, at least about 0.5, at least about 0.6, at least about 0.7, at least about 0.8, at least about 0.9, at least about 1, at least about 2, at least about 3, at least about 4, at least about 5, at least about 6, at least about 7, at least about 8, or at least about 9 mL of water per gram of carbonation medium per day. In some embodiments, the water stream can be added at a rate of no more than about 10, no more than about 9, no more than about 8, no more than about 7, no more than about 6, no more than about 5, no more than about 4, no more than about 3, no more than about 2, no more than about 1, no more than about 0.9, no more than about 0.8, no more than about 0.7, no more than about 0.6, no more than about 0.5, no more than about 0.4, no more than about 0.3, no more than about 0.2, no more than about 0.1, no more than about 0.09, no more than about 0.08, no more than about 0.07, no more than about 0.06, no more than about 0.05, no more than about 0.04, no more than about 0.03, or no more than about 0.02 mL of water per gram of carbonation medium per day.

Combinations of the above-referenced water stream addition rates are also possible (e.g., at least about 0.01 and no more than about 10 ml of water per gram of carbonation medium per day or at least about 0.5 and no more than about 2 mL of water per gram of carbonation medium per day), inclusive of all values and ranges therebetween. In some embodiments, the water stream can be added at a rate of about 0.01, at least about 0.02, at least about 0.03, at least about 0.04, at least about 0.05, at least about 0.06, at least about 0.07, at least about 0.08, at least about 0.09, at least about 0.1, at least about 0.2, at least about 0.3, at least about 0.4, at least about 0.5, at least about 0.6, at least about 0.7, at least about 0.8, at least about 0.9, at least about 1, at least about 2, at least about 3, at least about 4, at least about 5, at least about 6, at least about 7, at least about 8, about 9, or about 10 ml of water per gram of carbonation medium per day.

In some embodiments, the water stream can be added to the carbonation medium 12 to maintain a desired level of relative humidity in the immediate proximity of the carbonation medium (e.g., the volume within 10 m, within 5 m, or within 1 m of the carbonation medium). In some embodiments, step 12 can include maintaining the relative humidity in the immediate proximity of the carbonation medium at a level of at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%. In some embodiments, step 12 can include maintaining the relative humidity in the immediate proximity of the carbonation medium at a level of no more than about 100%, no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, no more than about 15%, or no more than about 10%. Combinations of the above-referenced values of relative humidity in the immediate proximity of the carbonation medium are also possible (e.g., at least about 5% and no more than about 70% or at least about 20% and no more than about 40%), inclusive of all values and ranges therebetween. In some embodiments, step 12 can include maintaining the relative humidity in the immediate proximity of the carbonation medium at a level of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

Without wishing to be bound by theory, it is not anticipated that a large amount of water is physically adsorbed on the surface of the carbonation medium. Instead, the presence of water drives the conversion of the carbonation medium (e.g., oxides and/or hydroxides) while in reaction with $CO_2$. In some embodiments, $Mg(OH)_2$ can form hydrated carbonates, such as hydromagnesite, lansfordite, nesquehonite, and/or $MgCO_3$. The decomposition of metastable, hydrous Mg-carbonate minerals occurs at lower temperatures than $MgCO_3$, but can likely convert to $MgCO_3$ rather than MgO under high purity $CO_2$ conditions in a calciner, as described below.

After the carbonation medium has contacted the ambient air to adsorb the $CO_2$ from the air, the carbonation medium becomes the carbon-containing stream. The carbon-containing stream is fed to the calciner at step 13. In some embodiments, the carbon-containing stream can include $MgCO_3$, dolomite (high magnesium calcium carbonate), sodium carbonate, sodium bicarbonate, silicon carbonate, calcium carbonate, calcium bicarbonate, potassium carbonate, potassium bicarbonate, nesquehonite, and/or hydromagnesite. In some embodiments, the carbon-containing stream can include dunite, calcite, wollastonite, and/or pyroxines.

In some embodiments, the carbon-containing stream can include a powder. In some embodiments, the carbon-containing stream can be in the form of pebbles or large rocks. In some embodiments, the carbon-containing stream can have an average particle size of at least about 5 μm, at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, the carbon-containing stream can have an average particle size of no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, no more than about 100 μm, no more than about 90 μm, no more than about 80 μm, no more than about 70 μm, no more than about 60 μm, no more than about 50 μm, no more than about 40 μm, no more than about 30 μm, no more than about 20 μm, or no more than about 10 μm.

Combinations of the above-referenced particle sizes are also possible (e.g., at least about 10 μm and no more than about 5 cm or at least about 100 μm and no more than about 1 cm), inclusive of all values and ranges therebetween. In some embodiments, the carbon-containing stream can have an average particle size of about 5 μm, about 10 μm, about 20 μm, about 30 μm, about 40 μm, about 50 μm, about 60 μm, about 70 μm, about 80 μm, about 90 μm, about 100 μm, about 200 μm, about 300 μm, about 400 μm, about 500 μm, about 600 μm, about 700 μm, about 800 μm, about 900 μm, about 1 mm, about 2 mm, about 3 mm, about 4 mm, about 5 mm, about 6 mm, about 7 mm, about 8 mm, about 9 mm, about 1 cm, at least about 2 cm, about 3 cm, about 4 cm, or about 5 cm.

At step 14, heat is applied to the calciner to decompose the carbon-containing stream to a gas stream and a carbonation medium stream. In some embodiments, the heat applied to the calciner can be via electric resistance heating. In some embodiments, the electric resistance heating can be powered by renewable electricity. In some embodiments, the renewable electricity can be supplied by wind power, solar power, geothermal power, nuclear energy, or any other suitable renewable energy source or combinations thereof. In some embodiments, the calciner can be sufficiently hot (e.g., from solar radiation), such that additional heat need not be supplied at step 14. In some embodiments, in the calciner, the carbon-containing stream can be calcined according to the following reaction.

$$MeCO_3 + Energy \longrightarrow MeO + CO_2$$

where Me represents a divalent metal cation.

The gas stream includes $CO_2$. In some embodiments, the gas stream can have a composition that includes at least about 80 vol %, at least about 85 vol %, at least about 90 vol %, at least about 91 vol %, at least about 92 vol %, at least about 93 vol %, at least about 94 vol %, at least about 95 vol %, at least about 96 vol %, at least about 97 vol %, at least about 98 vol %, at least about 99 vol %, at least about 99.1 vol %, at least about 99.2 vol %, at least about 99.3 vol %, at least about 99.4 vol %, at least about 99.5 vol %, at least about 99.6 vol %, at least about 99.7 vol %, at least about 99.8 vol %, or at least about 99.9 vol % $CO_2$.

The gas stream formed from the calcining is sequestered and/or utilized at step 15. In some embodiments, the gas stream can be sequestered at a sequestration space (e.g., an underground sequestration space). In some embodiments, the gas stream can be used as a $CO_2$-rich fuel. In some embodiments, the gas stream can be fed to a greenhouse to facilitate plant growth. In some embodiments, the gas stream can be fed to an environment where a controlled dosage of $CO_2$-rich gas is used to facilitate tree or plant growth. In some embodiments, the gas stream can be subjected to further processing to increase the $CO_2$ content. In some embodiments, $CO_2$ from the gas stream can be used to cure concrete. In some embodiments, $CO_2$ from the gas stream can be used as a feedstock for chemicals (e.g., ethanol). In some embodiments, $CO_2$ from the gas stream can be used to carbonate beverages. In some embodiments, $CO_2$ from the gas stream can be used for enhanced oil recovery. In some embodiments, the processing can include condensation of water. In some embodiments, the gas stream can be compressed into gas storage. In some embodiments, the compressed gas stream can be direct injected in a co-located facility. In some embodiments, the compressed gas stream can be transported to a location where it can be sequestered. In some embodiments, a portion of the gas stream can be sequestered while a portion of the gas stream can be utilized.

Step 16 includes feeding the carbonation medium stream to the carbonation station. The carbonation medium is a product of the calcining and is fed to the carbonation station. In some embodiments, the carbonation medium stream fed to the carbonation station can include at least a portion of recycled material. In some embodiments, the carbonation medium can be grinded prior to feeding to the carbonation station. The process then starts again at step 11, where the carbonation medium contacts the ambient air. In some embodiments, the carbonation medium can be transported from the calciner to the carbonation station via a conveyor or a series of conveyors. In some embodiments, the calciner can be at a higher elevation than the carbonation station, such that gravity can assist the conveyance of the carbonation medium to the carbonation station. In some embodiments, with recycling of carbonation medium, ultramafic rocks can become increasingly divided into materials such as $MgCO_3$, minor $CaCO_3$, and $SiO_2$ after each weathering step, and the calcining residue can become richer and richer in MgO and CaO, and thus more reactive and useful as feedstock for successive cycles.

Step 17 is an optional precursor to step 13 and/or step 14 and includes processing an air stream to produce an oxygen stream and feeding the oxygen stream to the calciner. Introducing oxygen to the calciner can improve the quality and thoroughness of the calcining. In some embodiments, the processing can be via an air separation unit. In some embodiments, the oxygen stream can include at least about 80 vol %, at least about 85 vol %, at least about 90 vol %, at least about 91 vol %, at least about 92 vol %, at least about 93 vol %, at least about 94 vol %, at least about 95 vol %, at least about 96 vol %, at least about 97 vol %, at least about 98 vol %, at least about 99 vol %, at least about 99.1 vol %, at least about 99.2 vol %, at least about 99.3 vol %, at least about 99.4 vol %, at least about 99.5 vol %, at least about 99.6 vol %, at least about 99.7 vol %, at least about 99.8 vol %, or at least about 99.9 vol % $O_2$. In some embodiments, the feeding of the oxygen stream into the calciner can occur at least partially concurrently to feeding the carbon-containing stream into the calciner at step 13. In some embodiments, the feeding of the oxygen stream into the calciner can occur at least partially concurrently to applying heat to the calciner at step 14.

Step 18 is an optional post-processing step that can be applied to the gas stream captured at step 15. Step 18 includes condensing and/or recycling water from the gas stream. Water in the gas stream is not desired for purposes of sequestering and storage or for use as a fuel. By removing the water from the gas stream, the purity of the gas stream (in terms of $CO_2$ content) increases and therefore the gas stream can have a wider range of possible storage locations or uses. In some embodiments, water capture from the gas stream can be recycled and fed to the carbonation station (i.e., added to the water stream from step 12).

Step 19 is optional and includes grinding sorbent material to form the carbonation medium. In some embodiments, the sorbent material can include a mined material. In some embodiments, the sorbent material can be recycled (e.g., from the calciner). Grinding the sorbent material can reduce the particle size and improve adsorption of $CO_2$ per unit mass. In some embodiments, the grinding can be via a ball mill crusher, an impact crusher, a cone crusher, or any other suitable grinding device or combinations thereof.

Step 21 is optional and includes hydrating the carbonation medium stream. The carbonation medium can be hydrated prior to feeding the carbonation medium to the carbonation station. In some embodiments, carbonation medium from the calciner (or mined carbonation medium) can be hydrated at the hydration station to form a hydroxide, in accordance with the following reaction.

$$MeO + H_2O \longrightarrow Me(OH)_2 + heat$$

where Me represents a divalent metal cation.

Hydrating the carbonation medium can improve the affinity of the carbonation medium to capture $CO_2$. For example, the reaction between $Ca(OH)_2$ and $CO_2$ can have lower activation energy than the reaction between CaO and $CO_2$. The residence time of a carbonation medium including hydroxides at the carbonation station can be less than the residence time of a carbonation medium without hydroxides. Hydration of the carbonation medium can allow for recovery of heat from the hydration reaction, as the reaction is exothermic. In some embodiments, the hydration can be achieved by passing the carbonation medium through a humid enclosure (e.g., with at least about 50%, at least about 60%, at least about 70%, at least about 80%, at least about 90%, or about 100% relative humidity, inclusive of all values and ranges therebetween). In some embodiments, the hydration can be achieved by misting water onto the carbonation medium (e.g., via one or more sprayers). In some embodiments, the hydration can be achieved by placing the carbonation medium in a water bath.

Figure 2:
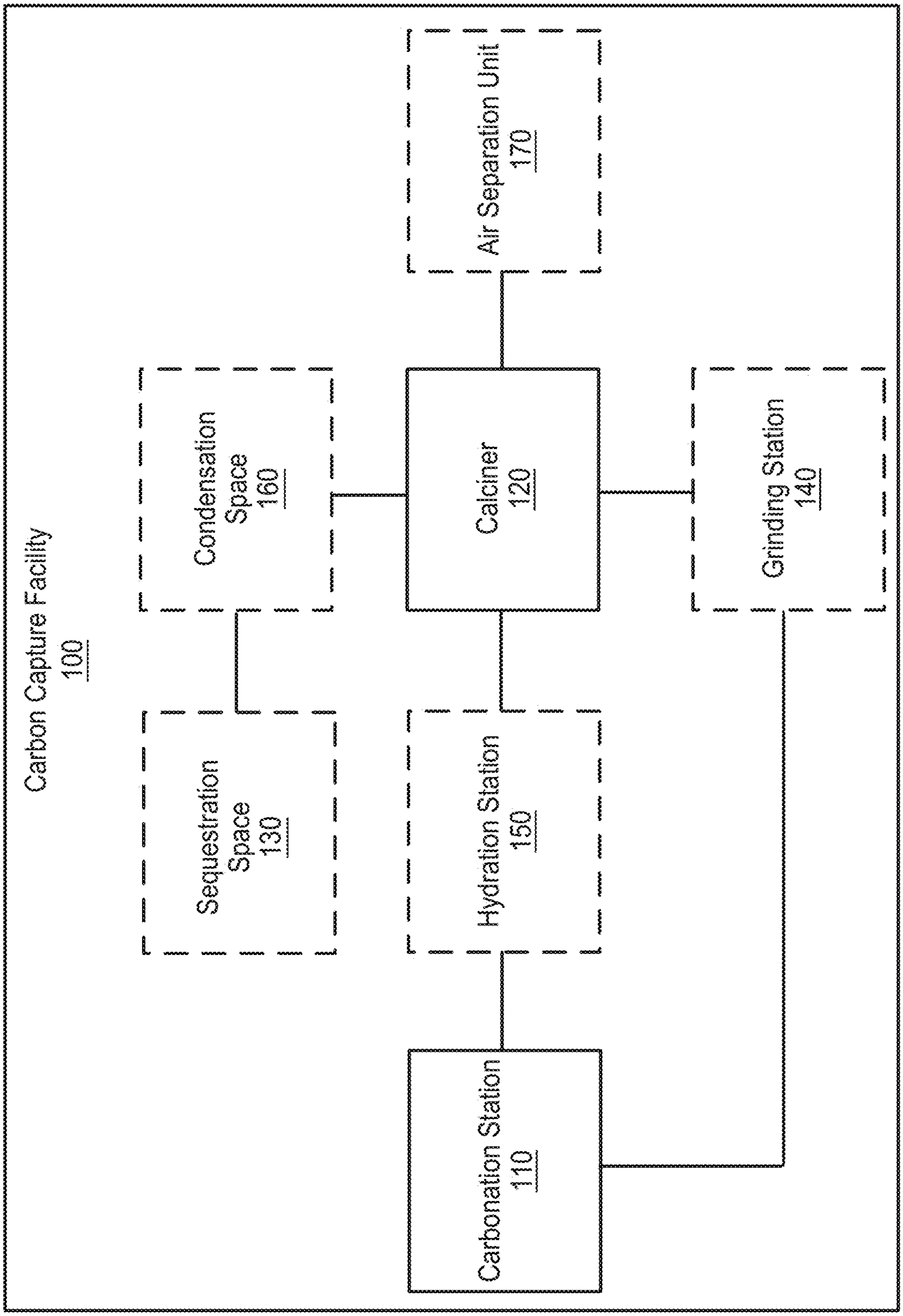
FIG. 2 is a block diagram of a carbon capture facility, according to an embodiment.

FIG. 2 is a block diagram of a carbon capture facility 100, according to an embodiment. As shown, the carbon capture facility includes a carbonation station 110 and a calciner 120. The carbon capture facility 100 optionally includes a sequestration space 130, a grinding station 140, a hydration station 150, a condensation space 160, and an air separation unit 170. In use, a carbonation medium adsorbs and reacts chemically with $CO_2$ in ambient air at the carbonation station 110 to form a carbon-containing stream. The carbon-containing stream is fed to the calciner 120, where the carbon-containing stream is calcined to form a gas stream and a stream of carbonation medium. The gas stream can be subjected to further processing in the condensation space 160 and stored in the sequestration space 130. The grinding station 140 can grind carbonation medium and/or carbon-containing medium and feed to the carbonation station 110 and/or the calciner 120. The hydration station 150 can optionally process the carbon-containing stream prior to feeding the carbon-containing stream to the calciner 120. The air separation unit 170 can process an air stream, prior to feeding the air stream to the calciner. The carbon capture facility 100 utilizes alkalinity to sequester a target compound (e.g., $CO_2$). In some embodiments, the carbon capture can be via reaction between the target compound and a carbonation medium. In some embodiments, the reaction can be a carbonation reaction.

The carbonation station 110 is a location where the carbonation medium contacts the ambient air and adsorbs and reacts with the $CO_2$ to become the carbon-containing stream. The carbonation station 110 includes $CO_2$ contactors. Some of the contactors described herein can be the same or substantially similar to those described in International Patent Publication WO2020/263910 ("the '910 publication"), filed Jun. 24, 2020, titled, "System and Methods for Enhanced Weathering and Calcining for $CO_2$ Removal from Air," the disclosure of which is hereby incorporated by reference in its entirety. The carbonation station 110 includes one or more water delivery devices to keep the moisture levels of the carbonation medium and/or localized humidity levels at the desired levels. In some embodiments, the water delivery devices can include one or more sprayers, hoses, mats, misters, sprinklers, or any other suitable water delivery device or combinations thereof. In some embodiments, the carbonation station 110 can include a plurality of carbonation plots positioned to expose the carbonation medium to ambient conditions. In some embodiments, one or more of the carbonation plots can be placed in the vicinity of facilities with heavy $CO_2$ exhaust. In some embodiments, the carbonation plots can include sheets of carbonation medium in powder form. In some embodiments, the carbonation plots can be arranged in stacked columns. In some embodiments, the carbonation station 110 can include a temperature sensor, a humidity sensor, and/or a gas flowmeter to measure the movement of ambient air in the vicinity of the carbonation plots. In some embodiments, the carbonation station 110 can be located outdoors. In some embodiments, the carbonation station can include a stirring implement for stirring the carbonation medium. In some embodiments, the stirring implement can include a mixing bar, a stirring rod, an impeller, and/or any other suitable device for stirring.

In some embodiments, the carbonation station 110 can be maintained at a relative humidity in the immediate proximity of the carbonation medium at a level of at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%. In some embodiments, the carbonation station 110 can be maintained at a relative humidity in the immediate proximity of the carbonation medium at a level of no more than about 100%, no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, no more than about 15%, or no more than about 10%. Combinations of the above-referenced values of relative humidity at the carbonation station 110 are also possible (e.g., at least about 5% and no more than about 70% or at least about 20% and no more than about 40%), inclusive of all values and ranges therebetween. In some embodiments, carbonation station 110 can be maintained at about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100% relative humidity.

The calciner 120 receives the carbon-containing stream from the carbonation station 110. In some embodiments, the calciner 120 can include a total flow calciner, a fluidized bed calciner, a rotary kiln calciner, a riser reactor-calciner, a separated tertiary air flow calciner, a hybrid calciner, or any other suitable calciner or combinations thereof. In some embodiments, the calciner 120 can include an oxy-fired calciner, an electric-fired calciner, a solar calciner, a "carbon-free" calciner. In some embodiments, the calciner 120 can use recycled waste heat from other processes. In some embodiments, the calciner 120 can be physically coupled to a power source. In some embodiments, the calciner 120 can be heated via electric resistance heating. In some embodiments, the electric resistance heating can be powered by grid electricity. In some embodiments, the electric resistance heating can be powered by renewable electricity. In some embodiments, the renewable electricity can be supplied by wind power, solar power, geothermal power, nuclear power, or any other suitable renewable energy source or combinations thereof. In some embodiments, the calciner 120 can include a valve and gate system for controlling inputs and outputs. In some embodiments, the calciner 120 can have a calcination efficiency of at least about 90%, at least about 91%, at least about 92%, at least about 93%, at least about 94%, at least about 95%, at least about 96%, at least about 97%, at least about 98%, or at least about 99%, inclusive of all values and ranges therebetween.

In some embodiments, the calciner 120 can include an oxy-fired calciner and can be operationally coupled to the air separation unit 170 and a condenser (e.g., in the condensation space 160). The air separation unit 170 can ensure pure or substantially pure oxygen is fed to the calciner 120. The condenser can condense water from the gaseous stream leaving the calciner 120. This can allow for the capture of $CO_2$ produced from fuel combustion. The complete combustion reaction can proceed in accordance with the following reaction, using methane as an exemplary combustion medium.

$$CH_4(g) + 2O_2(g) \longrightarrow CO_2(g) + H_2O(g) + \text{Energy}$$

The sequestration space 130 is optional and is fluidically coupled to the calciner 120. The sequestration space 130 receives the gas stream from the calciner 120. In some embodiments, the condensation space 160 can receive liquid from the gas stream before or concurrently to when the sequestration space 130 receives the gas stream from the calciner 120. In some embodiments, a condenser is used to increase the purity of the gas stream and remove water from the gas stream. The water can be received in the condensation space 160. The water can be utilized in the process or sold as a byproduct. In some embodiments, the carbon capture facility 100 can include other post-processing equipment (not shown) to process the gas stream when it exits the calciner 120. In some embodiments, the carbon capture facility 100 can include a dehydrator and/or a compressor.

In some embodiments, the sequestration space 130 can be co-located with the calciner 120. In some embodiments, the sequestration space 130 can be located underground. In some embodiments, the sequestration space 130 can be located immediately underneath the calciner 120. In some embodiments, the sequestration space 130 can be located a sufficient distance away from the calciner 120, such that $CO_2$ is transported from the calciner 120 to the sequestration space 130 (e.g., via fans and pipes). In some embodiments, the sequestration space 130 can include sorbents to improve storage capacity. In some embodiments, the sorbents can include activated carbon, graphene, silica, acrylonitrile, phosphorene, carbon nanotubes, biopolymers, metal organic frameworks, zeolites, grafted amines, or any other suitable sorbent or combinations thereof. In some embodiments, the sequestration space 130 can be maintained at a pressure of about 1 bar (gauge), about 2 bar, about 3 bar, about 4 bar, about 5 bar, about 6 bar, about 7 bar, about 8 bar, about 9 bar, about 10 bar, about 15 bar, about 20 bar, about 25 bar, about 30 bar, about 35 bar, about 40 bar, about 45 bar, about 50 bar, about 55 bar, about 60 bar, about 65 bar, about 70 bar, about 75 bar, about 70 bar, about 75 bar, about 80 bar, about 85 bar, about 90 bar, about 95 bar, about 100 bar, about 150 bar, about 200 bar, about 250 bar, about 300 bar, about 350 bar, about 400 bar, about 450 bar, about 500 bar, about 550 bar, about 600 bar, about 650 bar, about 700 bar, about 750 bar, about 800 bar, about 850 bar, about 900 bar, about 950 bar, or about 1,000 bar, inclusive of all values and ranges therebetween.

The grinding station 140 is an optional component of the carbon capture facility 100 and includes grinding media for processing of the carbonation medium and/or the carbon-containing stream. In some embodiments, mined materials can be fed to the grinding station 140 to reduce the particle size of the mined materials, before feeding to the carbonation station 110 and/or the calciner 120. In some embodiments, the grinding media can include a ball mill crusher, an impact crusher, and/or a cone crusher.

The hydration station 150 is an optional intermediate station between the calciner 120 and the carbonation station 110. In some embodiments, carbonation medium from the calciner can be hydrated at the hydration station to form a hydroxide, as described above in step 21, with reference to FIG. 1. In some embodiments, the hydration station can include a water bath, one or more misting devices (e.g., water sprayers), a humid enclosure, or any combination thereof. In some embodiments, the hydration station 150 can be part of the carbonation station 110. In other words, the hydration and the carbonation can occur at the same location.

The air separation unit 170 is an optional component for improving air quality before feeding the air to the calciner 120. In some embodiments, the air separation unit 170 can increase the oxygen content in an air stream, before feeding the oxygen-rich air stream into the calciner 120. In some embodiments, the air separation unit 170 can include a condenser to remove water from the air. In some embodiments, the air separation unit 170 can produce a pure stream of oxygen to feed the calciner 120. In some embodiments, the air separation unit 170 can allow for more efficient combustion in the calciner 120 as the air separation unit 170 can remove contaminants and inert materials from the air prior to feeding to the calciner 120.

Figure 3:
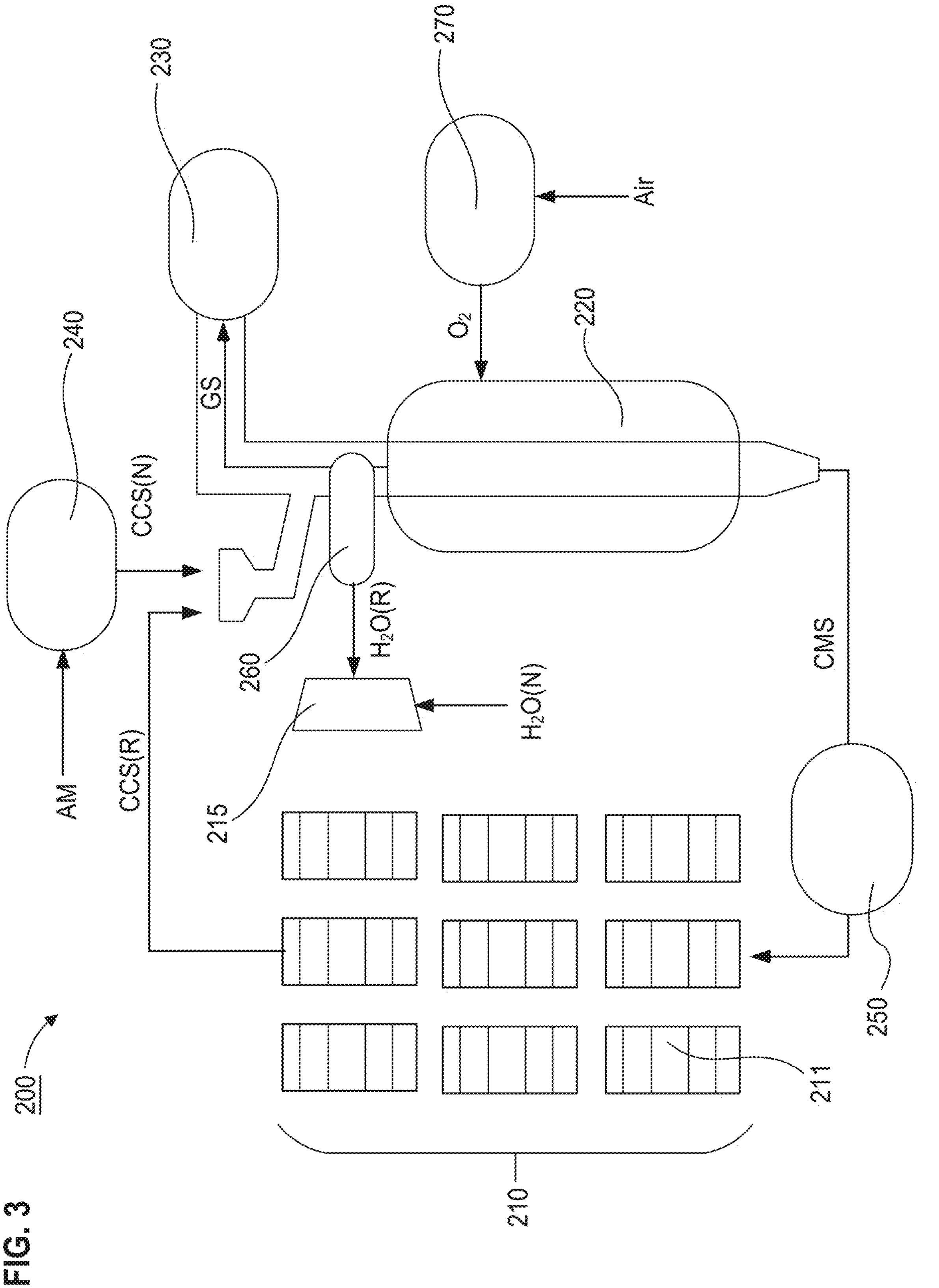
FIG. 3 is an illustration of a carbon capture facility, according to an embodiment.

FIG. 3 is a block diagram of a carbon capture facility 200, according to an embodiment. As shown, the carbon capture facility 200 includes a carbonation station 210, a calciner 220, a sequestration space 230, a grinding station 240, a hydration station 250, a condensation space 260, and an air separation unit 270. In some embodiments, the carbonation station 210, the calciner 220, the sequestration space 230, the grinding station 240, the hydration station 250, the condensation space 260, and the air separation unit 270 can be the same or substantially similar to the carbonation station 110, the calciner 120, the sequestration space 130, the grinding station 140, the hydration station 150, the condensation space 160, and the air separation unit 170, as described above with reference to FIG. 2. Thus, certain aspects of the carbonation station 210, the calciner 220, the sequestration space 230, the grinding station 240, the hydration station 250, the condensation space 260, and the air separation unit 270 are not described in greater detail herein.

In use, a carbonation medium stream CMS is processed via the hydration station 250 prior to being fed to the carbonation station 210. After carbonation at the carbonation plot 210, a recycled carbon-containing stream CCS(R) is fed to the calciner 220. Meanwhile, an adsorbent material AM is fed to the grinding station 240 and grinded to become a new carbon-containing stream CCS(N). The new carbon-containing stream CCS(N) is fed to the calciner concurrently with the recycled carbon-containing stream CCS(R). Meanwhile, air is fed to the air separation unit 270 and a stream rich in $O_2$ is fed from the air separation unit 270 to the calciner 220. After processing in the calciner 220, the carbon-containing streams CCS(R) and CCS(N) become a gas stream GS and the carbonation medium stream CMS. The carbonation medium stream CMS is fed back to the hydration station 250 while the gas stream GS is fed to the sequestration space 230. Between the calciner 220 and the sequestration space 230, the gas stream 230 is condensed and a recycled stream of water $H_2O$(R) is captured in the condensation space 260. The recycled stream of water $H_2O$(R) is fed to a sprayer 215. A new stream of water $H_2O$(N) is also fed to the sprayer 215. The sprayer 215 sprays water on the carbonation station 210.

The carbonation station 210 includes the carbonation plots 211. In some embodiments, the carbonation plots 211 can be positioned and configured to expose the compositions in the carbonation plots to ambient weathering. The carbonation plots 211 can be placed in an environment configured to maximize the temperature at the surface of the composition of the carbonation plots 211. In some embodiments, the carbonation plots 211 can be positioned in a natural environment (e.g., grasslands, deserts, mountainsides). In some embodiments, the carbonation plots 211 can be clustered into a group. In some embodiments, the clustered carbonation plots 211 enable centralized implementation of other system components for more efficient operation of the carbon capture facility 200. In some embodiments, the carbonation plots 211 can be distributed throughout a region of the planet (e.g., non-arable land in the Western United States). In some embodiments, a plurality of carbonation plots 211 are distributed throughout the planet.

As shown, the carbonation station 210 includes nine carbonation plots 211. In some embodiments, the carbonation station 210 can include at least about 2, at least about 3, at least about 4, at least about 5, at least about 6, at least about 7, at least about 8, at least about 9, at least about 10, at least about 20, at least about 30, at least about 40, at least about 50, at least about 60, at least about 70, at least about 80, at least about 90, at least about 100, at least about 100, at least about 200, at least about 300, at least about 400, at least about 500, at least about 600, at least about 700, at least about 800, at least about 900, at least about 1,000, at least about 1,500, at least about 2,000, at least about 2,500, at least about 3,000, at least about 3,500, at least about 4,000, at least about 4,500, at least about 5,000, at least about 5,500, at least about 6,000, at least about 6,500, at least about 7,000, at least about 7,500, at least about 8,000, at least about 8,500, at least about 9,000, at least about 9,500, at least about 10,000, at least about 11,000, at least about 12,000, at least about 13,000, at least about 14,000, at least about 15,000, at least about 16,000, at least about 17,000, at least about 18,000, at least about 19,000, at least about 20,000, at least about 25,000, at least about 30,000, at least about 35,000, at least about 40,000, at least about 45,000, at least about 50,000, at least about 55,000, at least about 60,000, or at least about 65,000 carbonation plots 211. In some embodiments, the carbonation station 210 can include no more than about 70,000, no more than about 65,000, no more than about 60,000, no more than about 55,000, no more than about 50,000, no more than about 45,000, no more than about 40,000, no more than about 35,000, no more than about 30,000, no more than about 25,000, no more than about 20,000, no more than about 19,000, no more than about 18,000, no more than about 17,000, no more than about 16,000, no more than about 15,000, no more than about 14,000, no more than about 13,000, no more than about 12,000, no more than about 11,000, no more than about 10,000, no more than about 9,500, no more than about 9,000, no more than about 8,500, no more than about 8,000, no more than about 7,500, no more than about 7,000, no more than about 6,500, no more than about 6,000, no more than about 5,500, no more than about 5,000, no more than about 4,500, no more than about 4,000, no more than about 3,500, no more than about 3,000, no more than about 2,500, no more than about 2,000, no more than about 1,500, no more than about 1,000, no more than about 900, no more than about 800, no more than about 700, no more than about 600, no more than about 500, no more than about 400, no more than about 300, no more than about 200, no more than about 100, no more than about 90, no more than about 80, no more than about 70, no more than about 60, no more than about 50, no more than about 40, no more than about 30, no more than about 20, no more than about 10, no more than about 9, no more than about 8, no more than about 7, no more than about 6, no more than about 5, no more than about 4, or no more than about 3 carbonation plots 211.

Combinations of the above-referenced numbers of carbonation plots in the carbonation station 210 are also possible (e.g., at least about 2 and no more than about 70,000 or at least about 500 and no more than about 5,000, inclusive of all values and ranges therebetween. In some embodiments, the carbonation station 210 can include about 2, about 3, about 4, about 5, about 6, about 7, about 8, about 9, about 10, about 20, about 30, about 40, about 50, about 60, about 70, about 80, about 90, about 100, about 100, about 200, about 300, about 400, about 500, about 600, about 700, about 800, about 900, about 1,000, about 1,500, about 2,000, about 2,500, about 3,000, about 3,500, about 4,000, about 4,500, about 5,000, about 5,500, about 6,000, about 6,500, about 7,000, about 7,500, about 8,000, about 8,500, about 9,000, about 9,500, about 10,000, about 11,000, about 12,000, about 13,000, about 14,000, about 15,000, about 16,000, about 17,000, about 18,000, about 19,000, about 20,000. about 25,000, about 30,000. about 35,000, about 40,000, about 45,000, about 50,000, about 55,000, about 60,000, about 65,000, or about 70,000 carbonation plots 211.

In some embodiments, the carbonation plots 211 can include sheets of carbonation medium. In some embodiments, the carbonation plots 211 can have length and/or width dimensions of at least about 10 cm, at least about 20 cm, at least about 30 cm, at least about 40 cm, at least about 50 cm, at least about 60 cm, at least about 70 cm, at least about 80 cm, at least about 90 cm, at least about 1 m, at least about 1.1 m, at least about 1.2 m, at least about 1.3 m, at least about 1.3 m, at least about 1.4 m, at least about 1.5 m, at least about 2 m, at least about 2.5 m, at least about 3 m, at least about 3.5 m, at least about 4 m, at least about 4.5 m, at least about 5 m, at least about 5.5 m, at least about 6 m, at least about 6.5 m, at least about 7 m, at least about 7.5 m, at least about 8 m, at least about 8.5 m, at least about 9 m, or at least about 9.5 m. In some embodiments, the carbonation plots 211 can have length and/or width dimensions of no more than about 10 m, no more than about 9.5 m, no more than about 9 m, no more than about 8.5 m, no more than about 8 m, no more than about 7.5 m, no more than about 7 m, no more than about 6.5 m, no more than about 6 m, no more than about 5.5 m, no more than about 5 m, no more than about 4.5 m, no more than about 4 m, no more than about 3.5 m, no more than about 3 m, no more than about 2.5 m, no more than about 2 m, no more than about 1.9 m, no more than about 1.8 m, no more than about 1.7 m, no more than about 1.6 m, no more than about 1.5 m, no more than about 1.4 m, no more than about 1.3 m, no more than about 1.2 m, no more than about 1.1 m, no more than about 1 m, no more than about 90 cm, no more than about 80 cm, no more than about 70 cm, no more than about 60 cm, no more than about 50 cm, no more than about 40 cm, no more than about 30 cm, or no more than about 20 cm. Combinations of the above-referenced length and width dimensions of the carbonation plots 211 are also possible (e.g., at least about 10 cm and no more than about 10 m or at least about 50 cm and no more than about 5 m), inclusive of all values and ranges therebetween. In some embodiments, the carbonation plots 211 can have length and/or width dimensions of about 10 cm, about 20 cm, about 30 cm, about 40 cm, about 50 cm, about 60 cm, about 70 cm, about 80 cm, about 90 cm, about 1 m, about 1.1 m, about 1.2 m, about 1.3 m, about 1.4 m, about 1.5 m, about 1.6 m, about 1.7 m, about 1.8 m, about 1.9 m, about 2 m, about 2.5 m, about 3 m, about 3.5 m, about 4 m, about 4.5 m, about 5 m, about 5.5 m, about 6 m, about 6.5 m, about 7 m, about 7.5 m, about 8 m, about 8.5 m, about 9 m, about 9.5 m, or about 10 m.

In some embodiments, the carbonation plots 211 can include thin sheets of carbonation medium powder and/or pebbles. In some embodiments, the carbonation plots 211 can include sheets with thicknesses of at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, at least about 4 cm, at least about 5 cm, at least about 6 cm, at least about 7 cm, at least about 8 cm, at least about 9 cm, at least about 10 cm, at least about 20 cm, at least about 30 cm, at least about 40 cm. In some embodiments, the carbonation plots 211 can include sheets with thicknesses of no more than about 50 cm, no more than about 40 cm, no more than about 30 cm, no more than about 20 cm, no more than about 10 cm, no more than about 9 cm, no more than about 8 cm, no more than about 7 cm, no more than about 6 cm, no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, or no more than about 2 mm. Combinations of the above-referenced sheet thicknesses are also possible (e.g., at least about 1 mm and no more than about 50 cm or at least about 5 mm and no more than about 1 cm), inclusive of all values and ranges therebetween. In some embodiments, the carbonation plots 211 can include sheets with thicknesses of about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, about 9 cm, about 10 cm, about 20 cm, about 30 cm, about 40 cm, or about 50 cm.

In some embodiments, each of the carbonation plots 211 can include at least about 1,000 tons, at least about 2,000 tons, at least about 3,000 tons, at least about 4,000 tons, at least about 5,000 tons, at least about 6,000 tons, at least about 7,000 tons, at least about 8,000 tons, at least about 9,000 tons, at least about 10,000 tons, at least about 20,000 tons, at least about 30,000 tons, at least about 40,000 tons, or at least about 50,000 tons of carbonation medium. In some embodiments, each of the carbonation plots 211 can include no more than about 60,000 tons, no more than about 50,000 tons, no more than about 40,000 tons, no more than about 30,000 tons, no more than about 20,000 tons, no more than about 10,000 tons, no more than about 9,000 tons, no more than about 8,000 tons, no more than about 7,000 tons, no more than about 6,000 tons, no more than about 5,000 tons, no more than about 4,000 tons, no more than about 3,000 tons, or no more than about 2,000 tons of carbonation medium. Combinations of the above-referenced amounts of carbonation medium are also possible (e.g., at least about 1,000 tons and no more than about 60,000 tons or at least about 5,000 tons and no more than about 40,000 tons), inclusive of all values and ranges therebetween. In some embodiments, each of the carbonation plots 211 can include about 1,000 tons, about 2,000 tons, about 3,000 tons, about 4,000 tons, about 5,000 tons, about 6,000 tons, about 7,000 tons, about 8,000 tons, about 9,000 tons, about 10,000 tons, about 20,000 tons, about 30,000 tons, about 40,000 tons, about 50,000 tons, or about 60,000 tons of carbonation medium.

In some embodiments, the thin sheets of carbonation medium of the carbonation plots 211 can be arranged in trays. In some embodiments, the trays can be stacked vertically. In some embodiments, each the carbonation plots 211 can include at least about 1, at least about 2, at least about 3, at least about 4, at least about 5, at least about 6, at least about 7, at least about 8, at least about 9, at least about 10, at least about 20, at least about 30, at least about 40, at least about 50, at least about 60, at least about 70, at least about 80, at least about 90, at least about 100, at least about 200, at least about 300, at least about 400, at least about 500, at least about 600, at least about 700, at least about 800, at least about 900, at least about 1,000, at least about 1,500, at least about 2,000, at least about 2,500, at least about 3,000, at least about 3,500, at least about 4,000, or at least about 4,500 trays. In some embodiments, each of the carbonation plots 211 can include no more than about 5,000, no more than about 4,500, no more than about 4,000, no more than about 3,500, no more than about 3,000, no more than about 2,500, no more than about 2,000, no more than about 1,500, no more than about 1,000, no more than about 900, no more than about 800, no more than about 700, no more than about 600, no more than about 500, no more than about 400, no more than about 300, no more than about 200, no more than about 100, no more than about 90, no more than about 80, no more than about 70, no more than about 60, no more than about 50, no more than about 40, no more than about 30, no more than about 20, no more than about 10, no more than about 9, no more than about 8, no more than about 7, no more than about 6, no more than about 5, no more than about 4, no more than about 3, or no more than about 2 trays. Combinations of the above-referenced numbers of trays in each of the carbonation plots 211 are also possible (e.g., at least about 1 and no more than about 5,000 or at least about 50 and no more than about 500), inclusive of all values and ranges therebetween. In some embodiments, the trays can be stacked vertically. In some embodiments, each the carbonation plots 211 can include about 1, about 2, about 3, about 4, about 5, about 6, about 7, about 8, about 9, about 10, about 20, about 30, about 40, about 50, about 60, about 70, about 80, about 90, about 100, about 200, about 300, about 400, about 500, about 600, about 700, about 800, about 900, about 1,000, about 1,500, about 2,000, about 2,500, about 3,000, about 3,500, about 4,000, about 4,500, or about 5,000 trays.

In some embodiments, the carbonation plots 211 can include a powder of carbonation medium. In some embodiments, the carbonation medium can be in the form of pebbles or large rocks. In some embodiments, the carbonation medium can have an average particle size of at least about 5 μm, at least about 10 μm, at least about 20 μm, at least about 30 μm, at least about 40 μm, at least about 50 μm, at least about 60 μm, at least about 70 μm, at least about 80

μm, at least about 90 μm, at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, the carbonation medium can have an average particle size of no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, no more than about 100 μm, no more than about 90 μm, no more than about 80 μm, no more than about 70 μm, no more than about 60 μm, no more than about 50 μm, no more than about 40 μm, no more than about 30 μm, no more than about 20 μm, or no more than about 10 μm.

Combinations of the above-referenced particle sizes are also possible (e.g., at least about 10 μm and no more than about 5 cm or at least about 100 μm and no more than about 1 cm), inclusive of all values and ranges therebetween. In some embodiments, the carbonation medium can have an average particle size of about 5 μm, about 10 μm, about 20 μm, about 30 μm, about 40 μm, about 50 μm, about 60 μm, about 70 μm, about 80 μm, about 90 μm, about 100 μm, about 200 μm, about 300 μm, about 400 μm, about 500 μm, about 600 μm, about 700 μm, about 800 μm, about 900 μm, about 1 mm, about 2 mm, about 3 mm, about 4 mm, about 5 mm, about 6 mm, about 7 mm, about 8 mm, about 9 mm, about 1 cm, at least about 2 cm, about 3 cm, about 4 cm, or about 5 cm.

Figure 4:
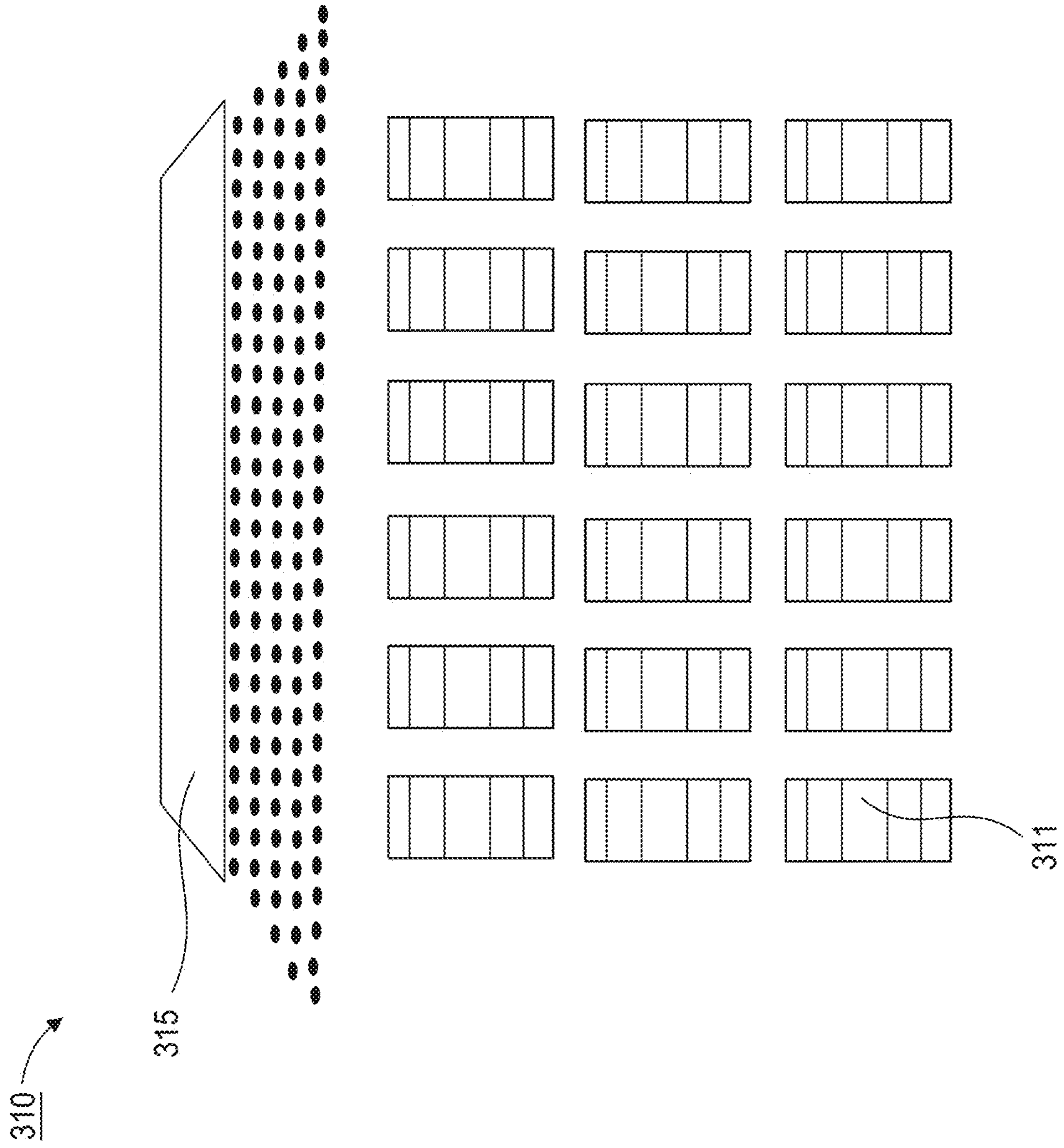
FIG. 4 is an illustration of a carbonation station, according to an embodiment.

FIG. 4 shows a carbonation station 310, according to an embodiment. As shown, the carbonation station 310 includes carbonation plots 311 and a sprayer 315. In some embodiments, the carbonation station 310, the carbonation plots 311, and the sprayer 315 can be the same or substantially similar to the carbonation station 210, the carbonation plots 211, and the sprayer 215 as described above with reference to FIG. 3. Thus, certain aspects of the carbonation station 310, the carbonation plots 311, and the sprayer 315 are not described in greater detail herein. As shown, the sprayer 315 sprays water onto the carbonation plots 311 to maintain a desired moisture level in the carbonation station 310. In some embodiments, the sprayer 315 can mist continuously. In some embodiments, the sprayer 315 can spray at intervals. In some embodiments, the sprayer 315 can be stationary. In some embodiments, the sprayer 315 can move laterally from above the carbonation plots 311 to maximize the ground covered by the sprayer 315. In some embodiments, carbonation plots 311 can be placed above and below the sprayer 315 and the sprayer can spray upward and downward to deliver water to the carbonation plots 311.

Figure 5:
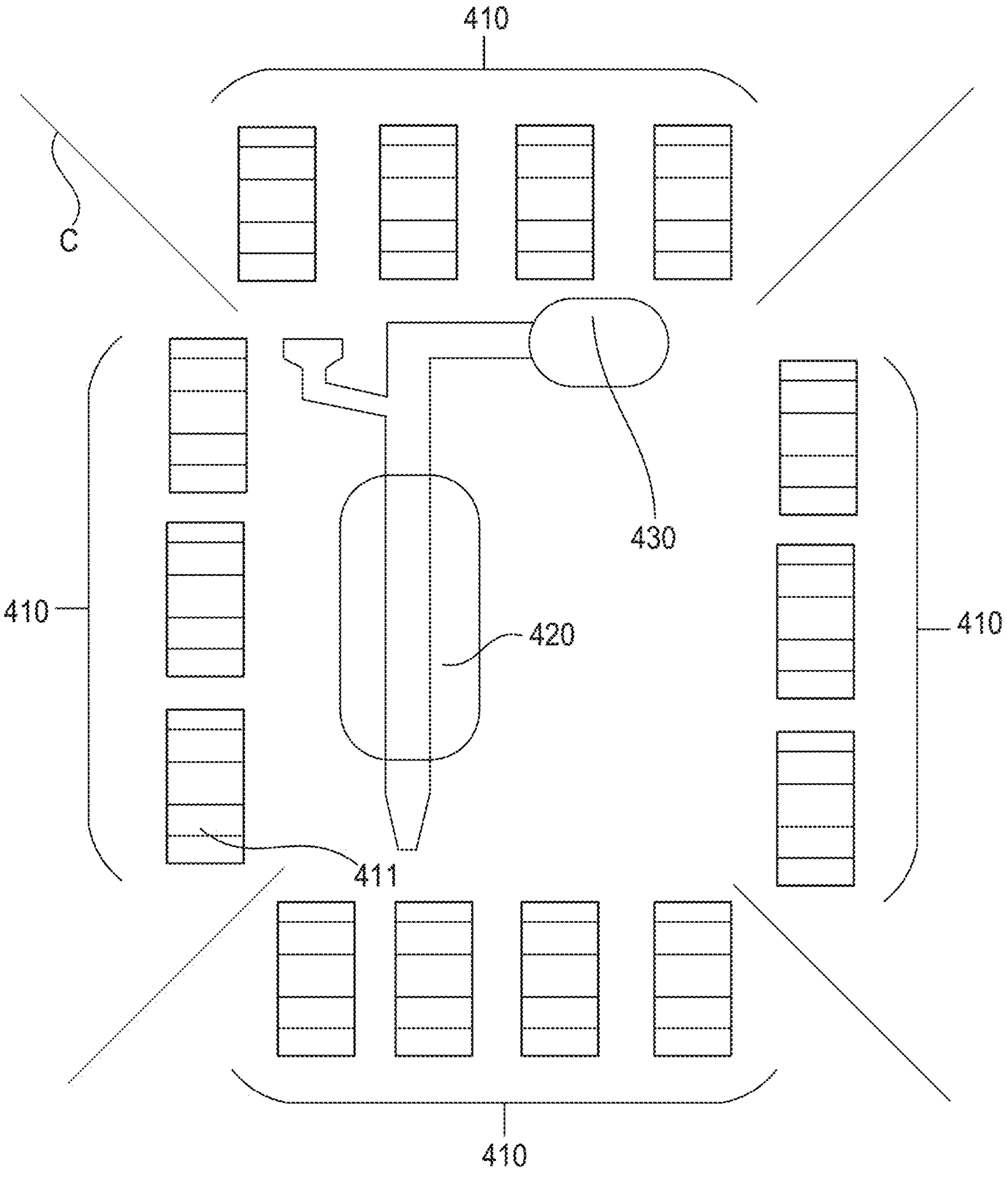
FIG. 5 is an illustration of a carbonation station, according to an embodiment.

FIG. 5 shows positioning of a carbonation station 410 surrounding a calciner 420 and a sequestration space 430. As shown, the carbonation station includes a plurality of carbonation plots 411. In some embodiments, the carbonation station 410, the carbonation plots 411, the calciner 420, and the sequestration space 430 can be the same or substantially similar to the carbonation station 210, the carbonation plots 211, the calciner 220, and the sequestration space 230, as described above with reference to FIG. 3. Thus, certain aspects of the carbonation plots 411, the calciner 420, and the sequestration space 430 are not described in greater detail herein.

FIG. 5 shows a layout of the carbonation station 410 with the carbonation plots 411 surrounding the calciner 420. This can be an advantageous layout, as it minimizes the distance carbonation medium and the carbon-containing streams travel for processing between the process units. In some embodiments, the carbonation plots 411 can be arranged in a circle pattern, an oval pattern, a square pattern, a rectangular pattern, or any other suitable pattern around the calciner 420, in order to minimize energy cost for transporting carbonation medium and carbon-containing streams. In some embodiments, multiple carbonation plots 411 can be staggered in maturation date, allowing them to feed into a central regeneration facility. Conveyors C surround the calciner 420, transporting material between the carbonation station 410 and the calciner 420.

Examples

Figure 6:
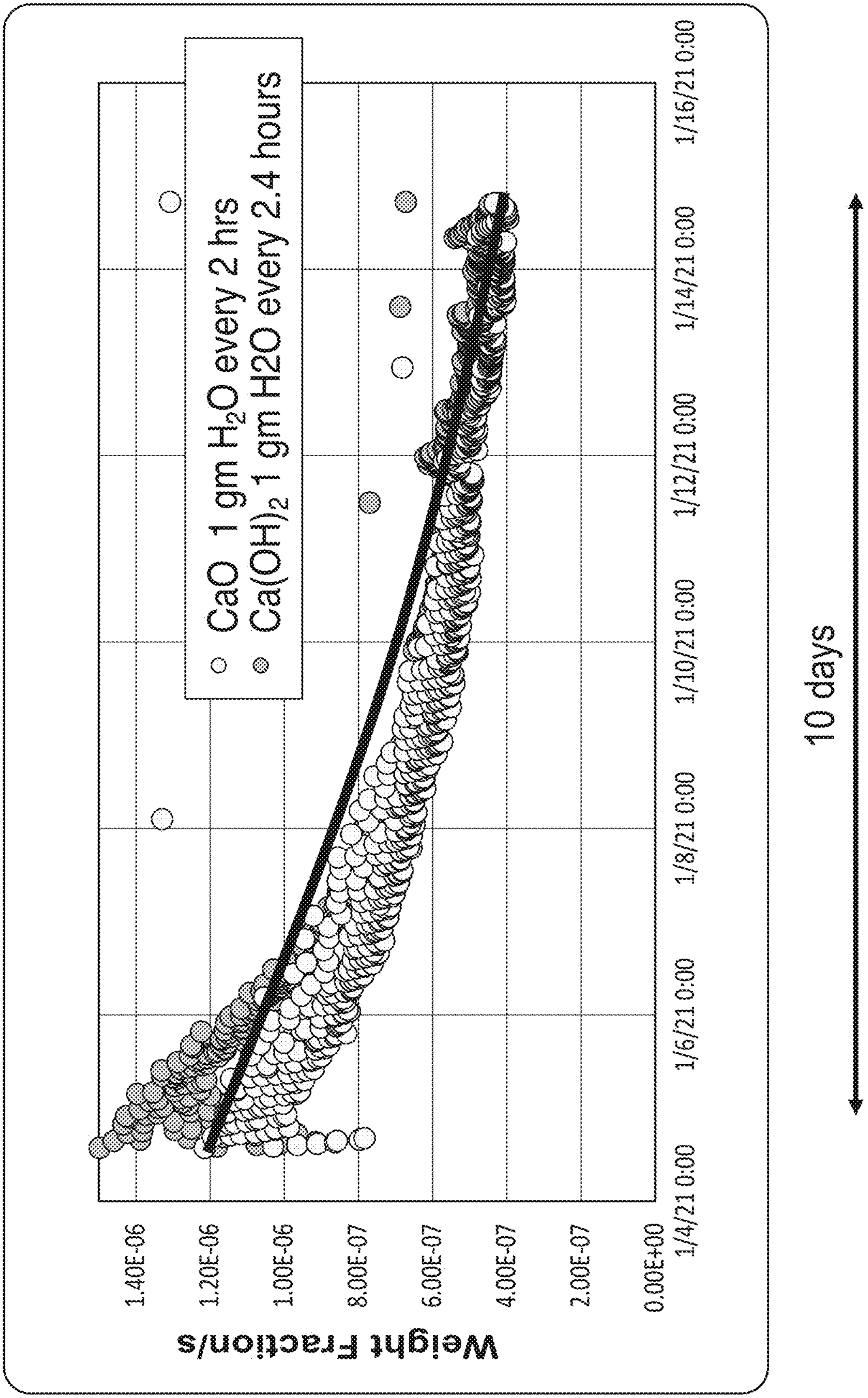
FIG. 6 is a plot of $CO_2$ uptake of different materials over a period of 10 days.

Example 1: 30 g of CaO and 30 g of $Ca(OH)_2$ powders were placed in petri dishes and their $CO_2$ uptake was measured over a period of 10 days. 1 gram of water was added to the CaO every 2 hours and 1 gram of water was added to the $Ca(OH)_2$ every 2.4 hours. FIG. 6 shows the $CO_2$ uptake data for these powders. The y-axis shows the $CO_2$ weight fraction of each powder that is taken up per second. As shown, over a 10-day period, $Ca(OH)_2$ starts with a higher uptake rate, and the two powders perform similarly starting around day 3. Both powders experience a reduction in $CO_2$ uptake over the 10-day period, as more of the CaO and $Ca(OH)_2$ are converted to $CaCO_3$. The reduction in rate of uptake slows over time. The model curve was generated to fit to the full agglomeration of CaO and $Ca(OH)_2$ data. The model curve indicates a starting uptake rate 1.2E-6 wt fraction/s acting on the declining amount of remaining reactant. If this rate is sustained, it can produce 75% carbonation in 14 days.

Figure 7:
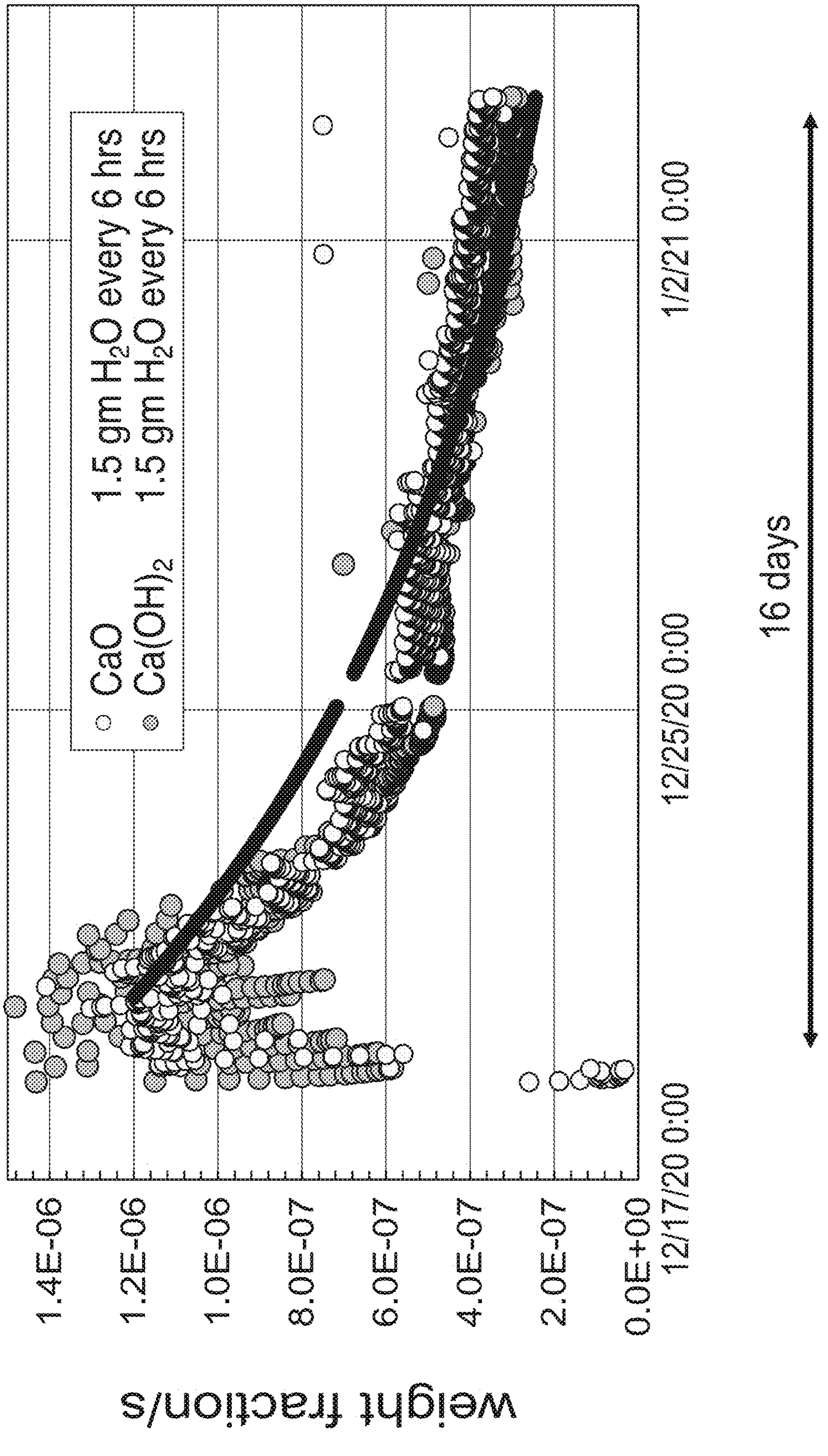
FIG. 7 is a plot of $CO_2$ uptake of different materials over a period of 16 days.

Example 2: 30 g of CaO and 30 g of $Ca(OH)_2$ powders were placed in petri dishes and their $CO_2$ uptake was measured over a period of 16 days. 1.5 grams of water were added to the CaO every 6 hours and 1.5 grams of water were added to the $Ca(OH)_2$ every 6 hours. FIG. 7 shows the $CO_2$ uptake data for these powders. The y-axis shows the $CO_2$ weight fraction of each powder that is taken up per second. On average, the CaO takes up 6E-7 wt fraction/s and the $Ca(OH)_2$ takes up 5.6E-7 wt fraction/s. The starting uptake rate for both powders is about 1.2E-6 wt fraction/s. If this rate is sustained, it can produce 75% carbonation in 14 days.

Figure 8:
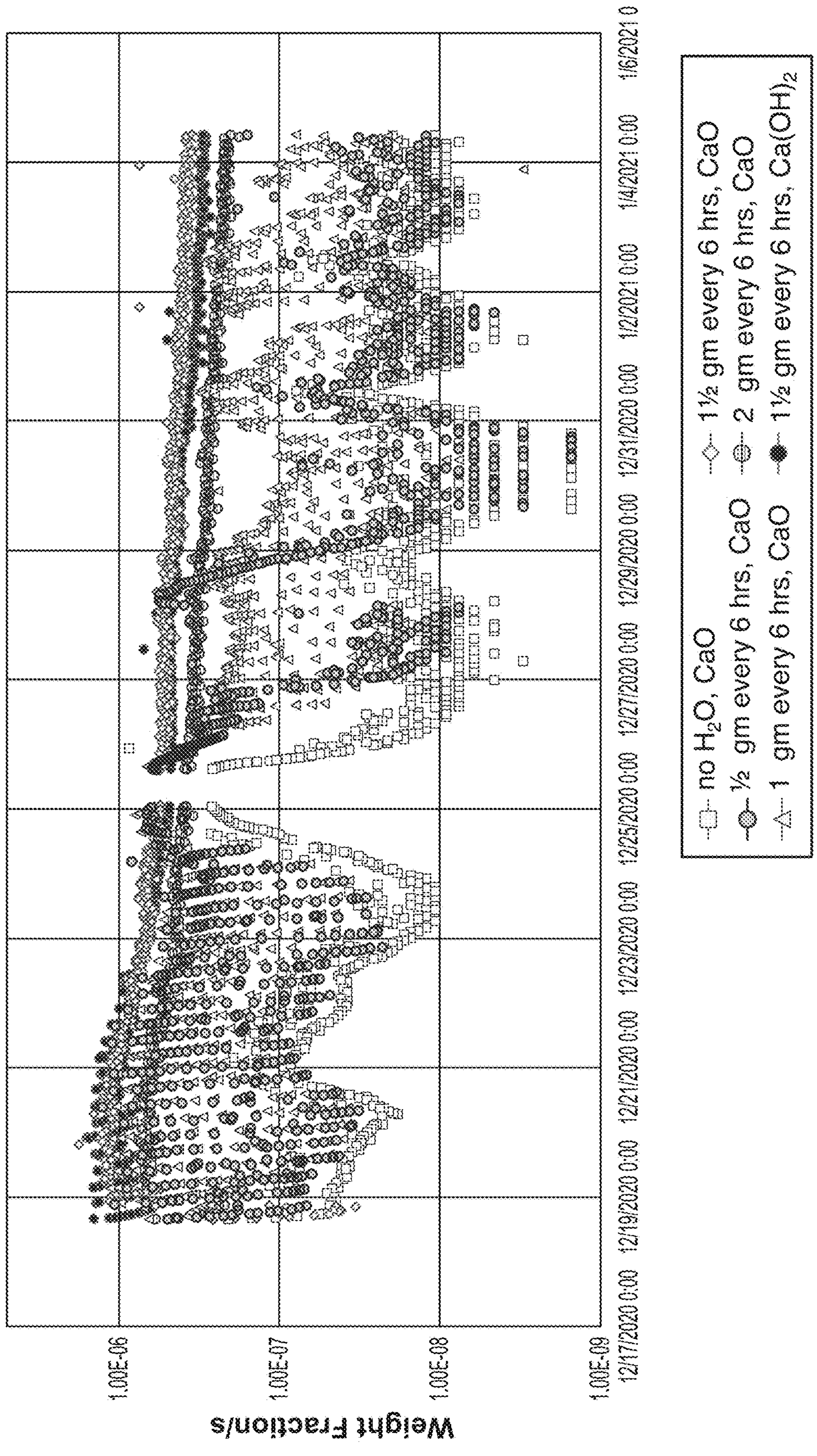
FIG. 8 is a plot of $CO_2$ uptake of different materials over a period of 16 days.

Example 3: 30 g of CaO and 30 g of $Ca(OH)_2$ powders were placed in petri dishes and their $CO_2$ uptake was measured over a period of 16 days. Water was added to different samples of CaO and $Ca(OH)_2$. Water was added to CaO at rates of 0.5, 1, 1.5, and 2 grams per 6 hours. Water was added to $Ca(OH)_2$ at a rate of 1.5 grams every 6 hours. Uptake rates are plotted in FIG. 8. The best uptake performance was observed in the powders in which 1.5 grams were added every 6 hours.

Figure 9:
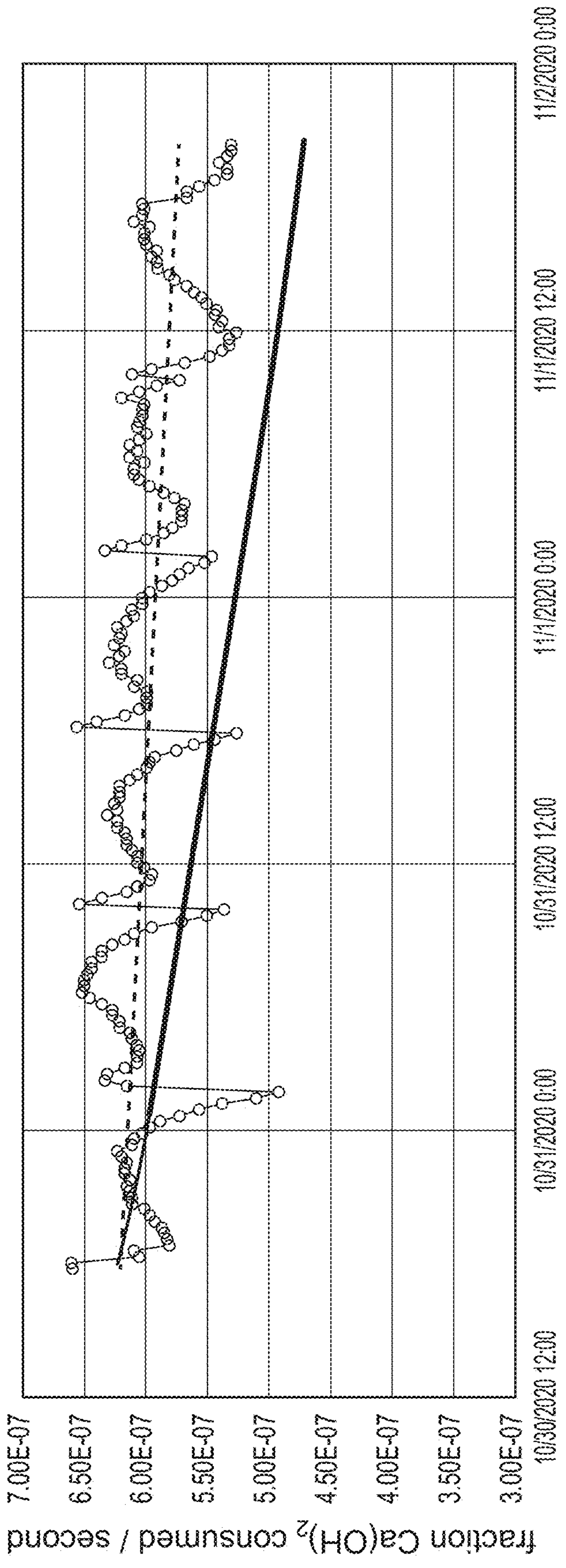
FIG. 9 is a plot of consumption of calcium hydroxide ($Ca(OH)_2$) over a period of 2 days.

Example 4: $Ca(OH)_2$ powder was placed in a petri dish and its uptake was measured over a period of two days. About 2 grams of water were added to the powder every 24 hours. FIG. 9 shows the uptake date of the powder over 2 days. The top trend line is a constant effective uptake rate (where the carbon dioxide per unit mass of material is consistent), while the bottom line is a decline in the consumption of $Ca(OH)_2$ consistent with an exponential rate law. The results demonstrate that there is no observed decay in the effective uptake rate over the first two days.

Figure 10:
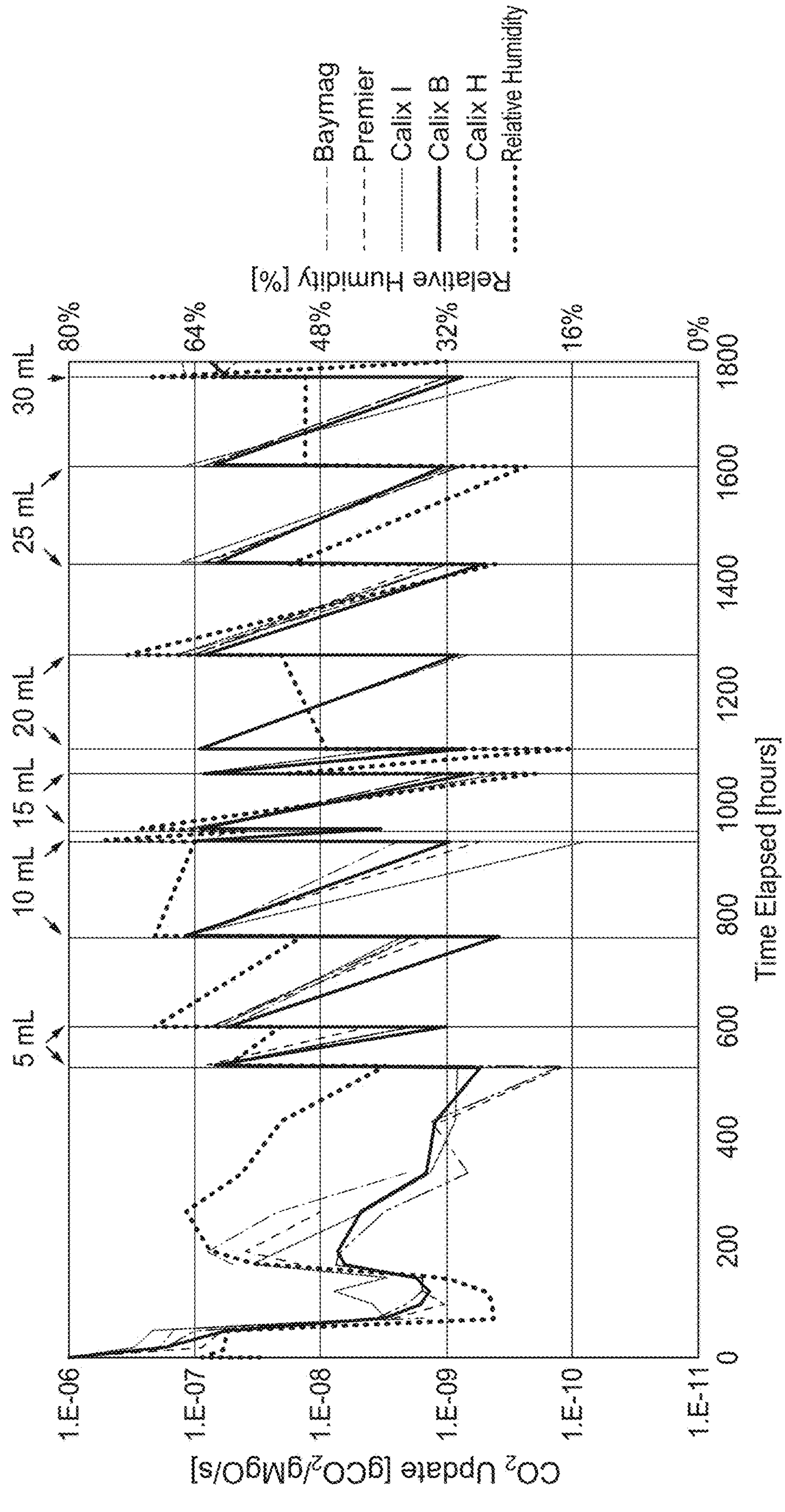
FIG. 10 is a plot of uptake rate versus time for varying magnesium oxide material suppliers.
Figure 11:
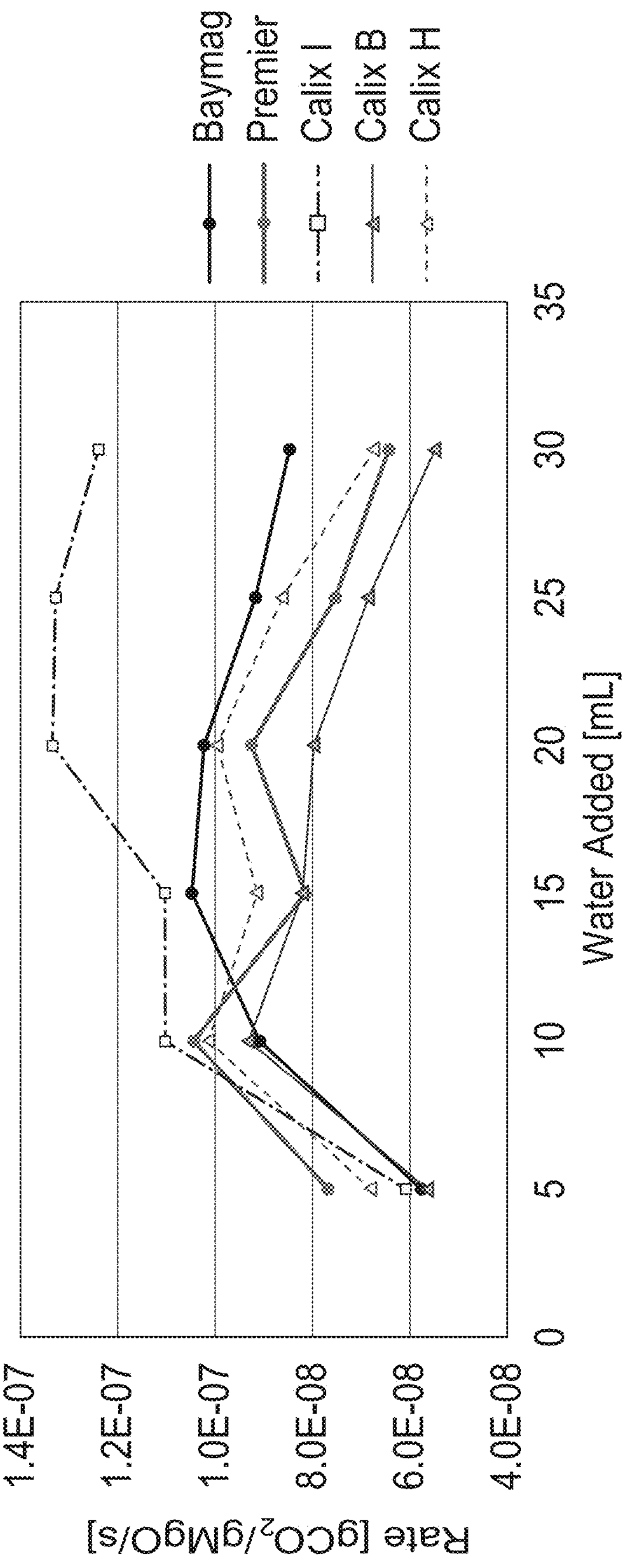
FIG. 11 is a plot of misting amount versus uptake rate as a function of material type.

Example 5: 50 g of MgO powder was placed in petri dishes for uptake of $CO_2$ was tested over a period of about 75 days exposed to ambient air. The MgO production brands were Baymag, Premier, and Calix (three different samples). FIG. 10 shows $CO_2$ uptake of each MgO sample and relative humidity in the environment. Water was added in amounts of 5-30 mL to each sample at various intervals. As shown, $CO_2$ uptake increases significantly with each addition of water across all of the samples. FIG. 11 shows the effects of water addition on each of the samples. As shown, adding a small to moderate amount of water improves $CO_2$ uptake, while adding too much water can oversaturate the powders, hindering $CO_2$ uptake.

Figure 12:
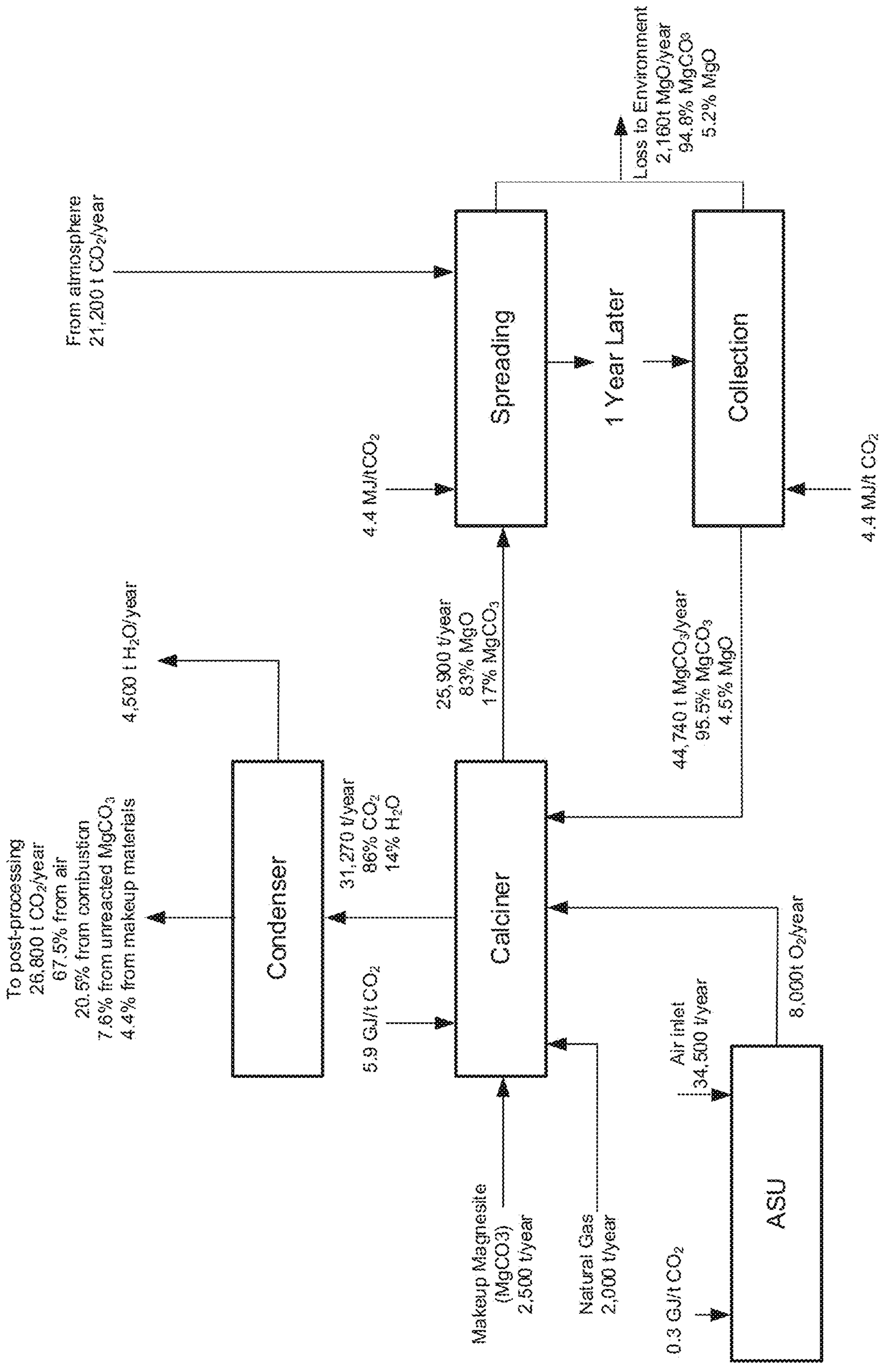
FIG. 12 is a visual representation of material and energy balances in a carbon capture facility.

Example 6: FIG. 12 depicts material and energy balances of a hypothetical MgO looping process. FIG. 12 represents material and energy flows on a per plot basis. The system operates with many plots at the same time. However, since the plots are staggered in their maturation time, only one plot is processed at a time. The number of overall plots was determined to ensure continuous operation of the calciner unit to eliminate costs associated with repeated startup and shutdown.

Example 7: Li—COR soil flux instruments were used to determine the flux of $CO_2$ to form solid carbonate minerals via reaction of air with MgO, CaO, and $Ca(OH)_2$. By creating a time series of these fluxes, $CO_2$ uptake change over time can be observed. $CO_2$ concentration was measured in the headspace of the chamber of the Li—COR instrument. The Li—COR instrument was lowered onto a tube to create a seal, separating the chamber from the surrounding air. This allows the Li—COR instrument to pull gas from the headspace and circulate it into a gas analyzer unit. The gas analyzer uses optical feedback-cavity enhanced absorption spectroscopy (OF-CEAS) to determine the concentration of $CO_2$ in the gas mixture. The gas analyzer then recirculates the gas back into the headspace of the chamber. Measuring headspace $CO_2$ concentration versus time yields an estimate of $CO_2$ flux from the air to form solid carbonate minerals. The flux values, initially reported in micromoles per square meter per second, can be converted to $CO_2$ uptake rates in terms of mass fraction of the reactant consumed per second, or moles per cubic meter of reactant surface area per second.

A first set of experiments evaluated $CO_2$ uptake into eight different layers of MgO powder, from 2 to 9 mm thick, using material obtained from Premier Magnesia. Eight different samples were shown to have similar rates of $CO_2$ uptake per unit mass of MgO. Without wishing to be bound by theory, this can indicate that, in layer thicknesses up to 9 mm, $CO_2$ diffusion into MgO powder does not limit reaction progress. Without wishing to be bound by theory, similar additional experiments indicate that, up to 3 cm, the layer thickness of MgO does not affect $CO_2$ uptake rate per unit mass of MgO reactant. Similar experiments were repeated to test the variability of $CO_2$ uptake across three different commercial MgO suppliers: Baymag, Calix, and Premier. There was no discernable rate difference between the materials from different suppliers.

Continued experiments under various conditions have yielded similar rates for $CO_2$ uptake via reaction of ambient air with CaO, $Ca(OH)_2$, and MgO ($\pm Mg(OH)_2$). Some experiments have yielded nearly constant, observed rates that gradually decline from about 1.2E-6 and 4E-7 weight fraction of initial oxide material per second, over periods of about two weeks. Such values can potentially lead to 75% carbonation of the experimental starting material in 2-6 weeks. However, since the amount of oxide reactant remaining after days of reaction is diminished, the measured $CO_2$ uptake diminishes over time, even if the actual rate is constant. Exponential fits can be used to determine the weight fraction of remaining oxide material that is consumed per second, yielding best fits (for several experiments with the fastest and least variable rates) in the range of about 1.2E-6 per second, constant over two weeks or more. This rate should produce 75% carbonation after two weeks of reaction.

Without wishing to be bound by theory, for the purpose of $CO_2$ removal from air, alone, there does not appear to be a minimum particle size. However, the larger the particles that can obtain the desired $CO_2$ uptake rate, the less likely those particles are to be lost to the environment. Additionally, material losses are combatted by keeping the material damp and thus less likely to be blown away or spilled. In the TEA, a substantial loss of oxide material in each cycle of carbonation and calcination was assumed. Steam treatment after calcination, as well as other activation methods, can regenerate MgO that has diminished $CO_2$ uptake capacity. This can aid in replenishing spent MgO without extracting additional resources.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method, comprising:

applying heat to a calciner to decompose a carbon-containing stream to a gas stream and a stream of a carbonation medium, the gas stream including $CO_2$;

at least one of sequestering or utilizing the gas stream;

feeding the stream of the carbonation medium to a carbonation station;

contacting the carbonation medium with ambient air at the carbonation station, such that the carbonation medium adsorbs $CO_2$ to form the carbon-containing stream;

during the contacting, adding a water stream to the carbonation medium at intervals of about 30 minutes to about 72 hours; and feeding the carbon-containing stream to the calciner.

2. The method of claim 1, wherein adding the water stream is via misting and/or spraying.

3. The method of claim 1, wherein adding the water is at a rate of between about 0.01 and about 0.5 mL of water per gram of carbonation medium.

4. The method of claim 1, wherein the carbonation medium is maintained at a moisture content between about 3 wt % and about 50 wt %.

5. The method of claim 1, further comprising:

grinding an adsorbent material to form the carbonation medium in a powder via at least one of a ball mill crusher, impact crushers, or a cone crusher.

6. The method of claim 1, wherein the carbonation medium includes at least one of magnesium oxide, magnesium silicates, silicon dioxide, calcium oxide, calcium hydroxide, calcium silicates, sodium oxide, sodium hydroxide, potassium oxide, potassium hydroxide, or magnesium hydroxide.

7. The method of claim 1, further comprising:

condensing an amount of water from the gas stream; and feeding the amount of water to the water stream.

8. The method of claim 1, further comprising:

processing an air stream via an air separation unit to produce an oxygen stream, the oxygen stream having a purity of at least about 95%; and feeding the oxygen stream to the calciner.

9. The method of claim 1, wherein the carbonation medium has an average particle size of less than about 75 μm.

10. The method of claim 1, wherein the carbonation station includes a plurality of carbonation contactors, each carbonation contactor of the carbonation contactors including a sheet of the carbonation medium, the sheet of the carbonation medium having a thickness between about 0.5 mm and about 10 mm.

11. The method of claim 1, wherein applying the heat to the calciner is via electric resistance heating powered by electricity.

12. The method of claim 1, further comprising:

monitoring a relative humidity, temperature, and air velocity levels of ambient air in close proximity to the carbonation medium during the contacting.

13. The method of claim 1, further comprising:

hydrating the carbonation medium prior to feeding the carbonation medium to the carbonation station.

14. A method, comprising:

applying heat to a calciner to decompose a carbon-containing stream into a gas stream and a stream of a carbonation medium, the gas stream including $CO_2$;

at least one of sequestering or utilizing the gas stream;

feeding the stream of the carbonation medium to a carbonation station;

contacting the carbonation medium with ambient air at the carbonation station, such that the carbonation medium adsorbs $CO_2$ to form the carbon-containing stream;

during the contacting, spraying and/or misting a water stream to the carbonation medium at a rate of between about 0.01 and about 0.5 mL of water per gram of carbonation medium; and feeding the carbon-containing stream to the calciner.

15. The method of claim 14, wherein the gas stream includes at least about 95% $CO_2$ by volume.

16. The method of claim 14, further comprising:

grinding an adsorbent material to form the carbonation medium into a powder.

17. The method of claim 14, wherein the adsorbent material includes at least one of magnesium oxide, magnesium silicate, silicon dioxide, calcium oxide, calcium hydroxide, calcium silicates, sodium oxide, sodium hydroxide, potassium oxide, potassium hydroxide, or magnesium hydroxide.

18. The method of claim 14, wherein the carbon-containing stream includes at least one of $MgCO_3$, dolomite (high magnesium calcium carbonate), sodium carbonate, sodium bicarbonate, silicon carbonate, calcium carbonate, calcium bicarbonate, potassium carbonate, potassium bicarbonate, nesquehonite, or hydromagnesite.

19. The method of claim 14, further comprising:

condensing an amount of water from the gas stream; and recycling the amount of water by feeding the amount of water to the water stream.

20. A method, comprising:

decomposing a carbon-containing stream into a gas stream and a stream of a carbonation medium in a calciner, the gas stream including $CO_2$, the carbonation medium including at least one of $MgCO_3$, sodium carbonate, sodium bicarbonate, silicon carbonate, calcium carbonate, calcium bicarbonate, nesquehonite, or hydromagnesite;

sequestering the gas stream;

feeding the stream of the carbonation medium to a carbonation station;

contacting the carbonation medium with ambient air at the carbonation station, such that the carbonation medium adsorbs $CO_2$ to form the carbon-containing stream;

during the contacting, adding a water stream to the carbonation medium at intervals of about 30 minutes to about 72 hours at a rate of between about 0.01 and about 0.5 mL of water per gram of carbonation medium; and feeding the carbon-containing stream to the calciner.

21. The method of claim 20, wherein the carbon-containing stream includes at least one of $MgCO_3$, dolomite (high magnesium calcium carbonate), sodium carbonate, sodium bicarbonate, silicon carbonate, calcium carbonate, calcium bicarbonate, potassoium carbonate, potassium bicarbonate, nesquehonite, or hydromagnesite.

22. The method of claim 20, further comprising:

applying heat to the calciner via electric resistance heating powered by electricity.

23. The method of claim 20, further comprising:

condensing an amount of water from the gas stream; and recycling the amount of water by feeding the amount of water to the water stream.

* * * * *